United States Patent [19]
Jeong

[11] Patent Number: 6,115,172
[45] Date of Patent: *Sep. 5, 2000

[54] THIN FILM ACTUATED MIRROR ARRAY

[75] Inventor: Seong-Hoon Jeong, Seoul, Rep. of Korea

[73] Assignee: Daewoo Electronics Co., Ltd., Seoul, Rep. of Korea

[*] Notice: This patent is subject to a terminal disclaimer.

[21] Appl. No.: 09/106,845

[22] Filed: Jun. 30, 1998

[30] Foreign Application Priority Data

Jun. 30, 1997 [KR] Rep. of Korea ............ 97-28928

[51] Int. Cl.⁷ .................................................. G02B 26/00
[52] U.S. Cl. ........................................................... 359/292
[58] Field of Search .......................... 359/290, 291, 359/292

[56] References Cited

U.S. PATENT DOCUMENTS 5,469,302  11/1995  Lim ........................................ 359/846
5,757,539  5/1998  Min ........................................ 359/290

FOREIGN PATENT DOCUMENTS

96/13745  5/1996  WIPO .

*Primary Examiner*—Georgia Epps
*Assistant Examiner*—Suzanne Letendre
*Attorney, Agent, or Firm*—Pillsbury Madison & Sutro LLP

[57] ABSTRACT

Thin film AMA is disclosed. The thin film AMA has an active matrix, a supporting member, an actuator, and a reflecting member. The actuator has a bottom electrode, two active layers, and two top electrodes. The actuator has maximum tilting angle due to margins formed between the bottom electrode and the two active layers or between the two active layers and the two top electrodes. Also, the tilting angle of the actuator is increased because the layers of the actuator respectively have proper thicknesses. Therefore, the quality of the picture projected onto a screen is enhanced and the arrangement of the AMA may be more easy.

20 Claims, 24 Drawing Sheets

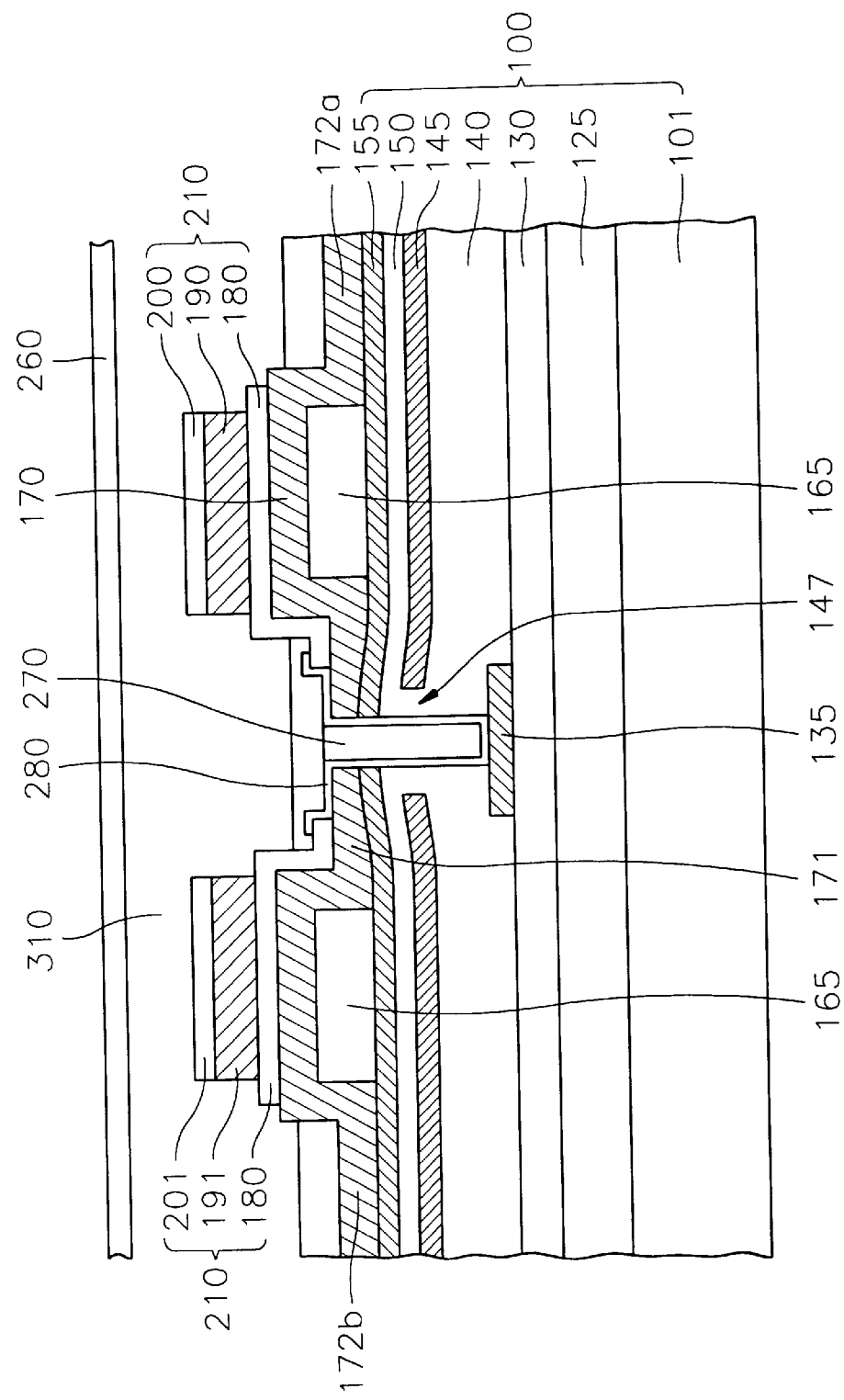

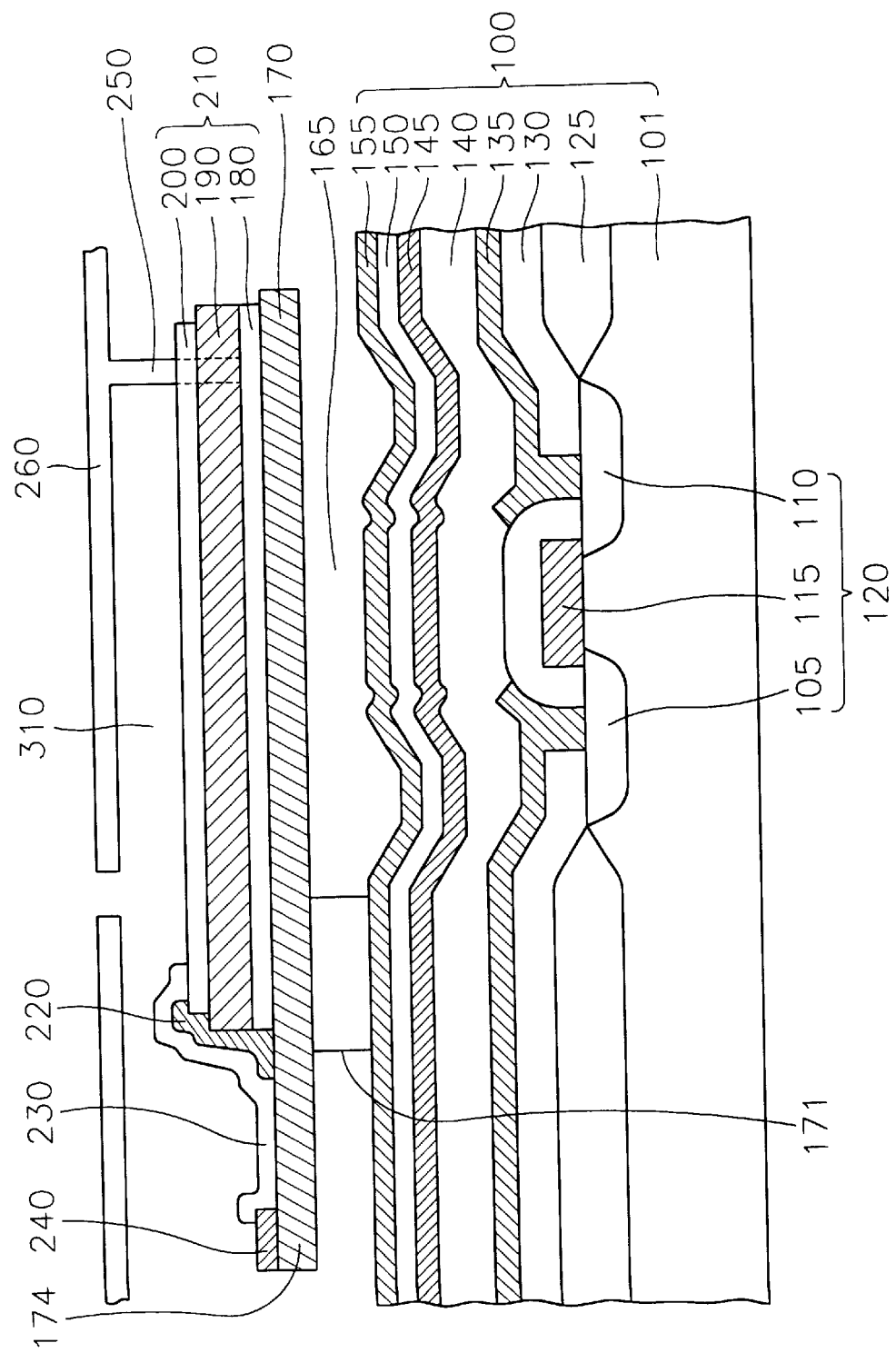

THIN FILM ACTUATED MIRROR ARRAY

BACKGROUND OF THE INVENTION

Field of the Invention

The present invention relates to a thin film actuated mirror array and more particularly to a thin film actuated mirror array including an actuator having a maximum tilting angle due to the construction of the actuator.

In general, light modulators are divided into two groups according to their optics. One type is a direct light modulator such as a cathode ray tube (CRT) and the other type is a transmissive light modulator such as a liquid crystal display (LCD). The CRT produces superior quality pictures on a screen, but the weight, the volume and the manufacturing cost of the CRT increase according to the magnification of the screen. The LCD has a simple optical structure, so the weight and the volume of the LCD are less than those of the CRT.

However, the LCD has a poor light efficiency of under 1 to 2% due to light polarization.

Also, there are some problems in the liquid crystal materials of the LCD such as sluggish response and overheating.

Thus, a digital mirror device (DMD) and actuated mirror arrays (AMA) have been developed in order to solve these problems. At the present time, the DMD has a light efficiency of about 5% and the AMA has a light efficiency of above 10%. The AMA enhances the contrast of a picture on a screen, so the picture on the screen is more apparent and brighter. The AMA is not affected by and does not affect the polarization of light and therefore, the AMA is more efficient than the LCD or the DMD.

The AMA is generally divided into a bulk type AMA and a thin film type AMA. The bulk type AMA is disclosed in U.S. Pat. No. 5,469,302 (issued to Dae-Young Lim). In the bulk type AMA, after a ceramic wafer which is composed of a multilayer ceramic inserted into metal electrodes therein is mounted on an active matrix having transistors, a mirror is mounted on the ceramic wafer by means of sawing the ceramic wafer. However, the bulk type AMA has disadvantages in that it demands a very accurate process and design, and the response of an active layer is slow. Therefore, the thin film AMA which is manufactured by using semiconductor technology has been developed.

The thin film AMA is disclosed at U.S. Ser. No. 08/814, 019 entitled "THIN FILM ACTUATED MIRROR ARRAY IN AN OPTICAL PROJECTION SYSTEM AND METHOD FOR MANUFACTURING THE SAME", which is now pending in USPTO and is subject to an obligation to the assignee of this application.

FIG. 1 is a perspective view for showing the thin film AMA, FIG. 2 is a cross-sectional view taken along line $A_1$–$A_2$ of FIG. 1, and FIG. 3 is a cross-sectional view taken along line $B_1$–$B_2$ of FIG. 1.

Referring to FIGS. 1 and 2, the thin film AMA has a substrate 1, an actuator 90 formed on the substrate 1, and a reflecting member 80 installed on the actuator 90.

Referring to FIG. 2, the substrate 1 has an electrical wiring (not shown), a connecting terminal 5 formed on the electrical wiring, a passivation layer 10 formed on the substrate 1 and on the connecting terminal 5, and an etching stop layer 15 formed on the passivation layer 10. The electrical wiring and the connecting terminal 5 receive a first signal from outside and transmit the first signal. Preferably, the electrical wiring has a metal oxide semiconductor (MOS) transistor for switching operation. The passivation layer 10 protects the substrate 1 having the electrical wiring and the connecting terminal 5. The etching stop layer 15 prevents the passivation layer 10 and the substrate 1 from etching during subsequent etching steps.

The actuator 90 has a supporting layer 30 having a first portion attached to a portion of the etching stop layer 15 under which the connecting terminal 5 is formed and a second portion formed parallel to the etching stop layer 15, a bottom electrode 35 formed on the supporting layer 30, an active layer 40 formed on the bottom electrode 35, a top electrode 45 formed on the active layer 40, a common line 50 formed on the first portion of the supporting layer 30, and a post 75 formed on a portion of the top electrode 50. An air gap 25 is interposed between the etching stop layer 15 and the second portion of the supporting layer 30. The common line 50 is connected to the top electrode 50. The reflecting member 80 is supported by the post 75 so that the reflecting member 80 is formed parallel to the top electrode 50.

Referring to FIG. 3, the actuator 90 has a via contact 60 formed in a via hole 55 and a connecting member 70 formed from the via contact 60 to the bottom electrode 35. The via hole 55 is formed from a portion of the first portion of the supporting layer 30 to the connecting terminal 5. The bottom electrode 35 is connected to the via contact 60 via the connecting member 70. Therefore, the first signal, that is a picture signal, is applied to the bottom electrode 35 from outside through the electrical wiring, the connecting terminal 5, the via contact 60, and the connecting member 70. At the same time, when a second signal, that is a bias signal, is applied to the top electrode 45 from outside through the common line 50, an electric field is generated between the top electrode 45 and the bottom electrode 35. Thus, the active layer 40 formed between the top electrode 45 and the bottom electrode 35 is deformed by the electric field.

Preferably, the supporting layer 30 has a T-shape and the bottom electrode 35 has a rectangular shape. The bottom electrode 35 is formed on a central portion of the supporting layer 30. The active layer 40 has a rectangular shape which is smaller than the bottom electrode 35 and the top electrode 45 has a rectangular shape which is smaller than the active layer 40.

A method for manufacturing the thin film AMA will be described as follows.

FIGS. 4A and 4D illustrate the manufacturing steps of the thin film AMA in FIG. 2. Referring to FIG. 4A, at first, the substrate 1 having the electrical wiring (not shown) and the connecting terminal 5 is provided. Preferably, the substrate 1 is composed of a semiconductor such as silicon (Si). The connecting terminal 5 is formed by using tungsten (W). The connecting terminal 5 is connected to the electrical wiring. The electrical wiring and the connecting terminal 5 receive the first signal and transmit the first signal to the bottom electrode 35.

The passivation layer 10 is formed on the substrate 1 having the electrical wiring and the connecting terminal 5. The passivation layer 10 is formed by using phosphor-silicate glass (PSG). The passivation layer 10 is formed by a chemical vapor deposition (CVD) method so that the passivation layer 10 has a thickness of from 0.1 to 1.0 μm. The passivation layer 10 protects the substrate 1 including the electrical wiring and the connecting terminal 5 during subsequent manufacturing steps.

The etching stop layer 15 is formed on the passivation layer 10 by using nitride so that the etching stop layer 15 has a thickness of from 1000 to 2000Å. The etching stop layer is formed by a low pressure chemical vapor deposition (LPCVD) method. The etching stop layer 15 protects the passivation layer 10 and the substrate 1 during subsequent etching steps.

A first sacrificial layer 20 is formed on the etching stop layer 15 by using PSG so that the first sacrificial layer 20 has a thickness of from 0.5 to 2.0 μm. The first sacrificial layer 20 enables the actuator 90 to form easily. The first sacrificial layer 20 is removed by using a hydrogen fluoride (HF) vapor when the actuator 90 is completely formed. The first sacrificial layer 20 is formed by an atmospheric pressure CVD (APCVD) method. In this case, the degree of flatness of the first sacrificial layer 20 is poor because the first sacrificial layer 20 covers the top of the substrate 1 having the electrical wiring and the connecting terminal 5. Therefore, the surface of the first sacrificial layer 20 is planarized by using a spin on glass (SOG) or by a chemical mechanical polishing (CMP) method. Preferably, the surface of the first sacrificial layer 20 is planarized by the CMP method.

After a portion of the first sacrificial layer 20 having the connecting terminal 5 formed thereunder is patterned along the column direction in order to expose a portion of the etching stop layer 15, a first layer 29 is formed on the exposed portion of the etching stop layer 15 and on the first sacrificial layer 20. The first layer 29 is formed by using a rigid material, for example a nitride or a metal so that the first layer 29 has a thickness of from 0.1 to 1.0 μm. When the first layer 29 is formed by an LPCVD method, the ratio of nitride gas is adjusted according to the reaction time so as to release the stress in the first layer 29.

Referring to FIG. 4B, after a first photo-resist layer 32 is formed on the first layer 29 by a spin coating method, the first photo-resist 32 is patterned so as to expose a portion of the first layer 29 along the horizontal direction. As a result, a rectangular portion of first layer 29 which is adjacent to the connecting terminal 5 is exposed. After a bottom electrode layer is formed on the exposed portion of the first layer 29 and on the first photo-resist layer 32 by a sputtering method, the bottom electrode layer is patterned to form the bottom electrode 35 on the exposed portion of the first layer 29 considering the position on which the common line 50 will be formed. So, the bottom electrode 35 has a rectangular shape. The bottom electrode 35 is formed by using an electrically conductive metal such as platinum (Pt), tantalum (Ta) or platinum-tantalum (Pt-Ta) so that the bottom electrode 35 has a thickness of from 0.1 to 1.0 μm.

A second layer 39 is formed on the bottom electrode 35 and on the first photo-resist layer 32. The second layer 39 is formed by using a piezoelectric material such as PZT (Pb(Zr, Ti)O$_3$) or PLZT ((Pb, La)(Zr, Ti)O$_3$) so that the second layer 39 has a thickness of from 0.1 to 1.0 μm, preferably, about 0.4 μm. Also, the second layer 39 is formed by using an electrostrictive material such as PMN (Pb(Mg, Nb)O$_3$). The second layer 39 is formed by a sol-gel method, a sputtering method or a CVD method. Subsequently, the second layer 39 is annealed by a rapid thermal annealing (RTA) method. The second layer 39 will be patterned so as to form the active layer 40.

A top electrode layer 44 is formed on the second layer 39. The top electrode layer 44 is formed by using an electrically conductive metal such as aluminum (Al), platinum or tantalum. The top electrode layer 44 is formed by a sputtering method or a CVD method so that the top electrode layer 44 has a thickness of from 0.1 to 1.0 m.

Referring to FIG. 4C, after a second photo-resist layer (not shown) is coated on the top electrode layer 44 by a spin coating method, the top electrode layer 44 is patterned so as to from the top electrode 45 having a rectangular shape by using the second photo-resist layer as an etching mask. Then, the second photo-resist layer is removed by striping. The second layer 39 is patterned by the same method as that of the top electrode layer 44. That is, after a third photo-resist layer (not shown) is coated on the top electrode 45 and on the second layer 39 by a spin coating method, the second layer 39 is patterned so as to form the active layer 40 by using the third photo-resist layer as an etching mask. The active layer 40 has a rectangular shape which is wider than that of the top electrode 45. In this case, the active layer 40 is smaller than the bottom electrode 35. Then, the third photo-resist layer is removed by striping.

The first layer 29 is patterned so as to form the supporting layer 30 by the above-described method. The supporting layer 30 has a T-shape which differs from that of the bottom electrode 35. The bottom electrode 35 is formed on the central portion of the supporting layer 30.

The common line 50 is formed on the first portion of the supporting layer 30 after the first photo-resist layer 32 is removed. Namely, after a fourth photo-resist layer (not shown) is coated on the supporting layer 30 by a spin coating method and then the fourth photo-resist is patterned to expose the first portion of the supporting layer 30, the common line 50 is formed on the exposed portion of the supporting layer 30 by using an electrically conductive metal such as platinum, tantalum, platinum-tantalum or aluminum. The common line 50 is formed by a sputtering method or a CVD method so that the common line 50 has a thickness of from 0.5 to 2.0 μm. At that time, the common line 50 is separated from the bottom electrode 135 by a predetermined distance and is attached to the top electrode 45 and to the active layer 40.

A portion of the first portion of supporting layer 30 having the connecting terminal thereunder and a portion which is adjacent to the portion of the first portion of the supporting layer 30 are exposed when the fourth photo-resist is patterned. The via hole 55 is formed from the portion of the first portion of the supporting layer 30 to the connecting terminal 5 through the etching stop layer 15 and the passivation layer 10 by an etching. The via contact 60 is formed in the via hole 55 from the connecting terminal 5 to the supporting layer 30. At the same time, the connecting member 70 is formed on the portion which is adjacent to the portion of the first portion of the supporting layer 30 from the bottom electrode 35 to the via contact 60. Thus, the via contact 60, the connecting member 70, and the bottom electrode 35 are connected one after another. The via contact 60 and the connecting member 70 are formed by using an electrically conductive metal such as platinum, tantalum or platinum-tantalum. The connecting member 70 has a thickness of from 0.5 to 1.0 μm. Thus, the actuator 90 having the top electrode 45, the active layer 40, the bottom electrode 35 and the supporting layer 30, is completed after the fourth photo-resist is removed by etching.

Referring to FIG. 4D, after the first sacrificial layer 20 is removed by using a hydrogen fluoride vapor, a second sacrificial layer 85 is formed on the actuator 90 by using a polymer having a fluidity. The second sacrificial layer 85 is formed by a spin coating method so that the second sacrificial layer 85 covers the top electrode 45. Subsequently, the second sacrificial layer 85 is patterned to expose a portion of the top electrode 45. The post 75 is formed on the exposed portion of the top electrode 45 and the reflecting member 80 is formed on the post 75 and on the second sacrificial layer 85. The post 75 and the reflecting member 80 are simultaneously formed by using a reflective metal such as aluminum, platinum or silver. The post 75 and the reflecting member 80 are formed by a sputtering method or a CVD method. Preferably, the reflecting member 80 for reflecting a incident light from a light source (not shown) is a mirror and has a thickness of from 0.1 to 1.0 μm. The reflecting member 80 has a rectangular plate shape to cover the top electrode 45. The actuator 90 which the reflecting member 80 is formed thereon is completed as shown in FIGS. 1 and 2 after the second sacrificial layer 85 is removed by etching.

In the thin film AMA, the second signal is applied to the top electrode 45 through the common line 150 from outside. At the same time, the first signal is applied to the bottom electrode 35 through the electrical wiring, the connecting terminal 5, the via contact 60 and the connecting member 70 from outside. Thereby, an electric field is generated between the top electrode 45 and the bottom electrode 35. The active layer 40 formed between the top electrode 45 and the bottom electrode 35 is deformed by the electric field. The active layer 40 is deformed in the direction perpendicular to the electric field. The active layer 40 actuates in the direction opponent to the supporting layer 30. That is, the actuator 90 having the active layer 40 actuates upward by a predetermined tilting angle.

The reflecting member 80 for reflecting the incident light from the light source is tilted with the actuator 90 because the reflecting member 80 is supported by the post 75 and is formed on the actuator 90. Hence, the reflecting member 80 reflects the light onto the screen, so the picture is projected onto the screen.

However, in the above-described thin film AMA, the actuator may not have a maximum tilting angle because the construction of the actuator has not been detail researched yet. That is, for the maximum tilting angle of the actuator, the thicknesses of the layers of the actuator and margins among the layers have not researched, so the quality of the picture projected onto the screen may be limited.

SUMMARY OF THE INVENTION

Accordingly, considering the conventional problems as described above, it is an object of the present invention to provide a thin film actuated mirror array including an actuator having a maximum tilting angle, so the quality of a picture projected onto a screen is increased.

To accomplish the object, there is provided in the present invention a thin film actuated mirror array having an active matrix, a supporting member, an actuator, and a reflecting member. The active matrix has a substrate including a metal oxide semiconductor transistor installed therein for switching operation and a first metal layer having a drain pad prolonged from a drain of the metal oxide semiconductor for transmitting the first signal. The supporting member has a supporting line formed above the active matrix, a supporting layer integrally formed with the supporting line, and a plurality of anchors respectively formed between the active matrix and portions of the supporting layer adjacent to the supporting line.

The actuator has a bottom electrode for receiving the first signal, a first top electrode for receiving the second signal and generating a first electric field, a second top electrode for receiving the second signal and generating a second electric field, a first active layer formed between the first portion of the bottom electrode and the first top electrode and deformed by the first electric field, and a second active layer formed between the second portion of the bottom electrode and the second top electrode and deformed by the second electric field. The bottom electrode is formed on the supporting layer. The first top electrode corresponds to a first portion of the bottom electrode and the second top electrode corresponds to a second portion of the bottom electrode.

The bottom electrode has a reverse U-shape about the supporting line, the first active layer has a rectangular plate shape, the second active layer has a rectangular plate shape which is parallel to the first active layer, the first top electrode has a rectangular plate shape which is smaller than that of the first active layer, and the second top electrode has a rectangular plate shape which is smaller than that of the second active layer.

The reflecting member reflects a light incident from a light source. The reflecting member is formed above the actuator.

In a first embodiment of the present invention, if a length of the bottom electrode is L, both ends of the first portion of the bottom electrode are respectively longer than both ends of the first active layer by margins of 0.01 L to 0.02 L and both ends of the second portion of the bottom electrode are respectively longer than both ends of the second active layer by margins of 0.01 L to 0.02 L. At that time, the first active layer has a size equal to the first top electrode and the second active layer has a size equal to the second top electrode. Also, if the first and the second top electrodes respectively have thicknesses of t's, the first and the second active layers are respectively have thicknesses of about 6.0 to 8.0 t, and the bottom electrode has a thicknesses of about 2.5 to 5.5 t.

In a second embodiment of the present invention, when a length of the bottom electrode is L, both ends of the first portion of the bottom electrode are respectively longer than both ends of the first active layer by margins of 0.01 L to 0.02 L, both ends of the second portion of the bottom electrode are respectively longer than both ends of the second active layer by margins of 0.01 L to 0.02 L, both ends of the first active layer are respectively longer than both ends of the first top electrode by margins of 0.01 L to 0.02 L, and both ends of the second active layer are respectively longer than both ends of the second top electrode by margins of 0.01 L to 0.02 L. At that time, if the first and the second top electrodes respectively have thicknesses of t's, the first and the second active layers are respectively have thicknesses of about 6.0 to 8.0 t, and the bottom electrode has a thicknesses of about 2.0 to 5.5 t.

In a third embodiment of the present invention, when a length of the bottom electrode is L, the first and the second active layers respectively have lengths of L's, both ends of the first active layer are respectively longer than both ends of the first top electrode by margins of 0.01 L to 0.02 L, and both ends of the second active layer are respectively longer than both ends of the second top electrode by margins of 0.01 L to 0.02 L. In this case, if the first and the second top electrodes respectively have thicknesses of t's, the first and the second active layers are respectively have thicknesses of about 6.0 to 8.0 t, and the bottom electrode has a thicknesses of about 2.5 to 6.0 t.

In a fourth embodiment of the present invention, when a length of the bottom electrode is L, the first and the second active layers respectively have lengths of L's, and the first and the top electrodes respectively have lengths of L's. In this case, if the first and the second top electrodes respectively have thicknesses of t's, the first and the second active layers are respectively have thicknesses of about 6.0 to 8.0 t, and the bottom electrode has a thicknesses of about 3.0 to 6.0 t.

In the thin film AMA according to the present invention, the first signal is applied from outside to the bottom electrode through the MOS transistor, the drain pad, and a via contact. At the same time, the second signal is applied from outside to the first and the second top electrodes through the common line and a first and a second top electrode connecting members. Thus, a first electric field is generated between the first top electrode and the bottom electrode and a second electric field is generated between the second top electrode and the bottom electrode. The first active layer formed between the first top electrode and the bottom electrode is deformed by the first electric field and the second active layer formed between the second top electrode and the bottom electrode is deformed by the second electric field. The first and the second active layers are respectively deformed in the directions perpendicular to the first and the second electric fields. The actuator having the first active layer and the second active layer is actuated in the opposite direction to the position where the supporting layer is located. That is, the actuator is tilted upward.

The reflecting member reflecting the light incident from the light source is tilted with the actuator. Hence, the reflecting member reflects the light onto the screen, so the picture is projected on the screen.

According to the present invention, the actuator can have a maximum tilting angle through the various constructions of the actuators and the simulation results, so the quality of the picture projected onto the screen can be increased and the arrangement of the AMA may be more easy. In the thin film AMA according to the present invention, the actuator having the first margins is preferable, in which the top electrodes have the same sizes as those of the active layers and the arms of the bottom electrodes are respectively longer than the lengths of the active layers by the first margins. Also, regarding the thicknesses of the layers of the actuator, it is preferably that the bottom electrode is 2 to 6 times thicker than the top electrodes and the active layers are 6 or 8 times thicker than the top electrodes.

BRIEF DESCRIPTION OF THE DRAWINGS

The above object and advantages of the present invention will become more apparent by describing in detail preferred embodiments thereof with reference to the attached drawings, in which:

FIG. 7 is a cross-sectional view taken along line $D_1$–$D_2$ of FIG. 5;

FIG. 14 is a cross-sectional view for showing a thin film actuated mirror array according to a third embodiment of the present invention;

DETAILED DESCRIPTION OF THE INVENTION

Hereinafter, the preferred embodiments of the present invention will be explained in more detail with reference to the accompanying drawings.

Embodiment 1

Figure 1:
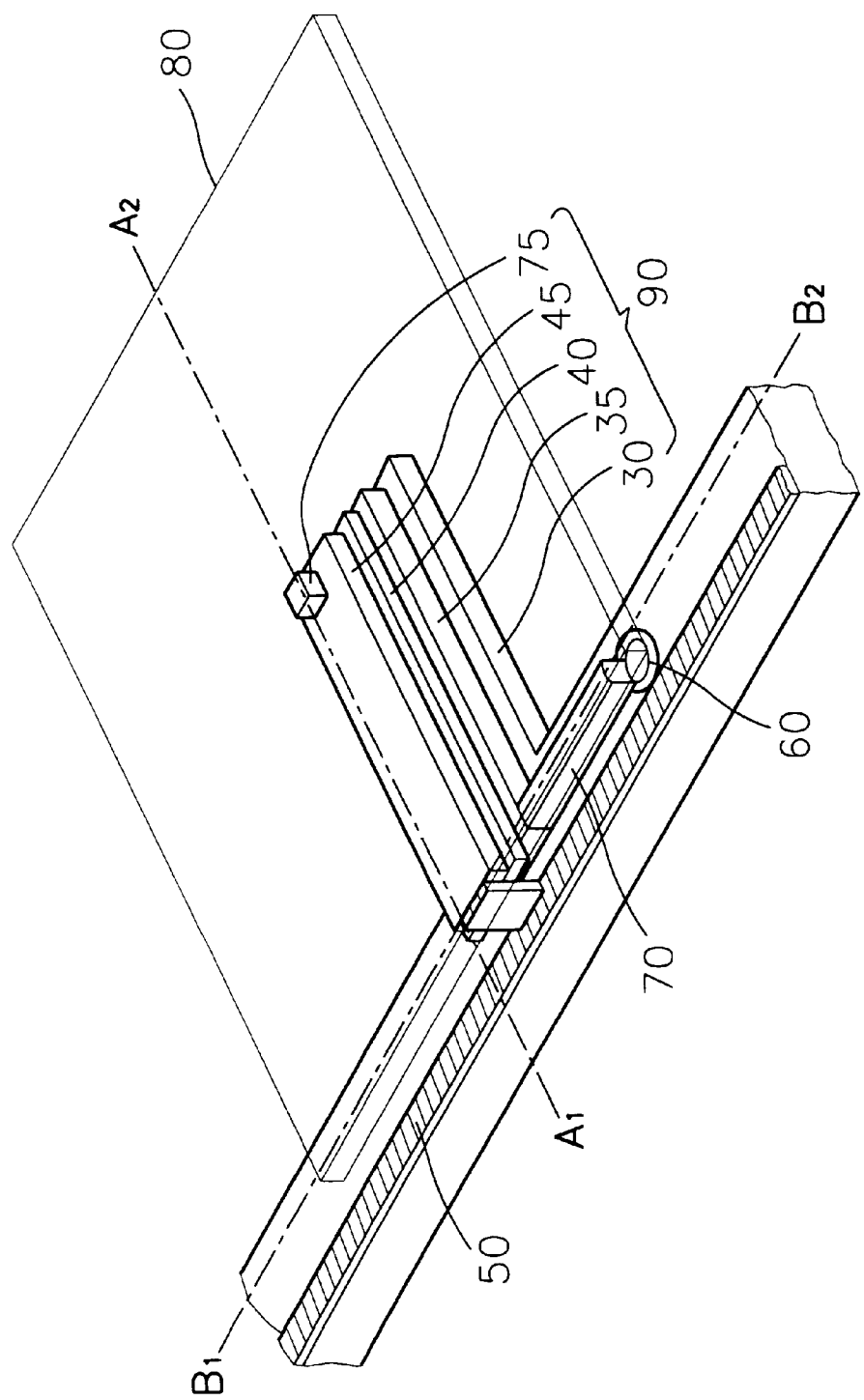
FIG. 1 is a perspective view for showing a thin film actuated mirror array disclosed in a prior application of the assignee of this application.
Figure 2:
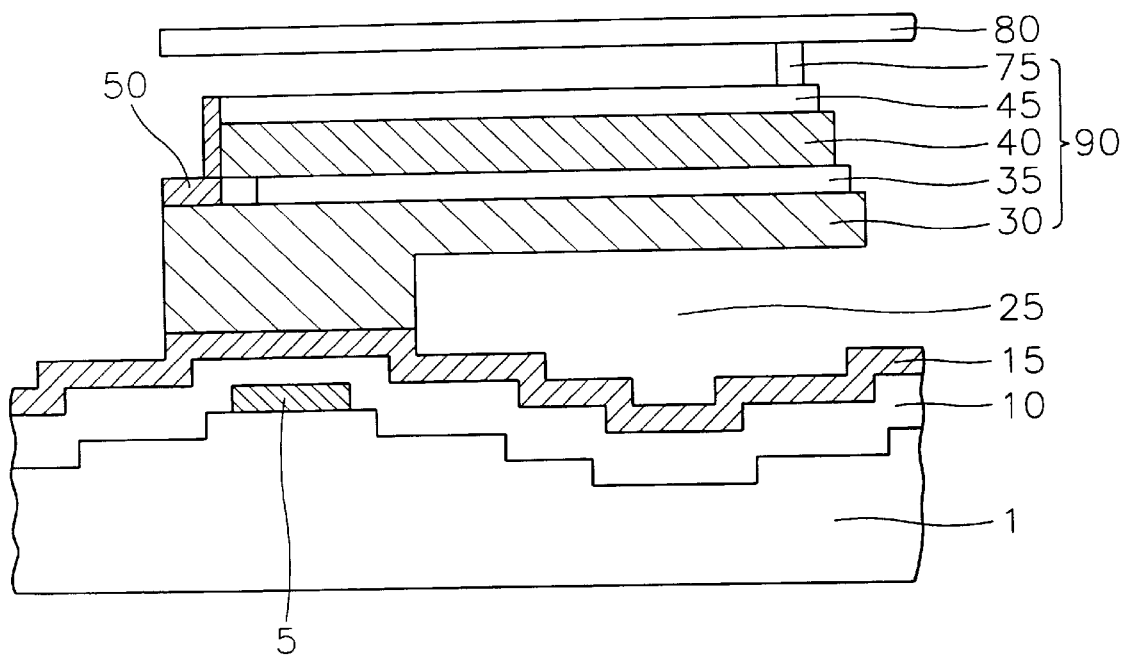
FIG. 2 is a cross-sectional view taken along line $A_1$–$A_2$ of FIG. 1.
Figure 3:
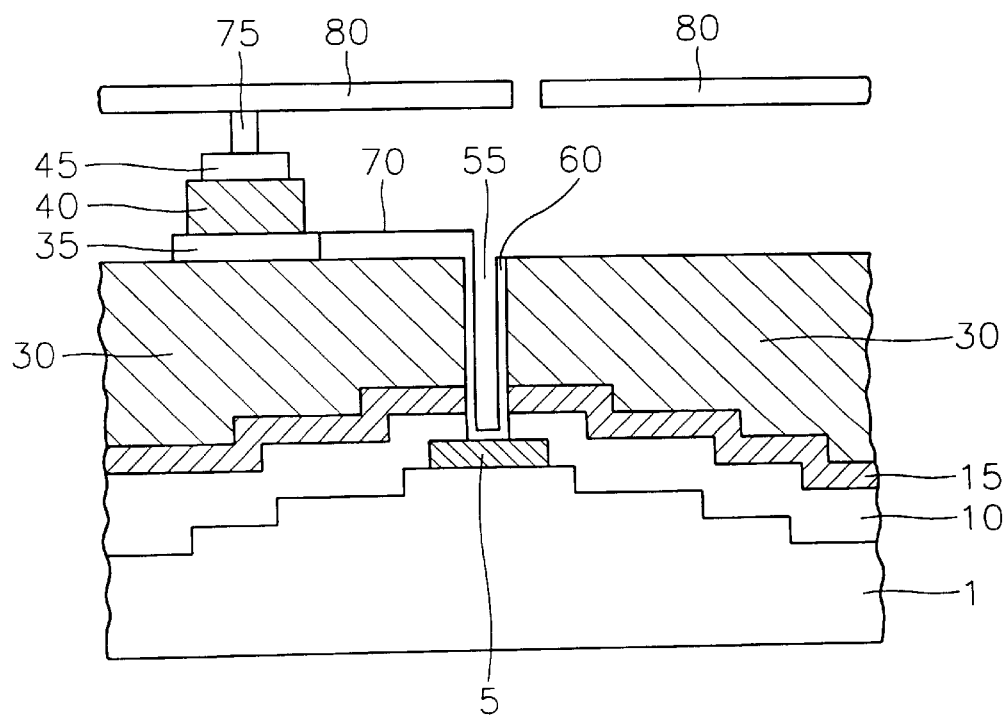
FIG. 3 is a cross-sectional view taken along line $B_1$–$B_2$ of FIG. 1.
Figure 4A:
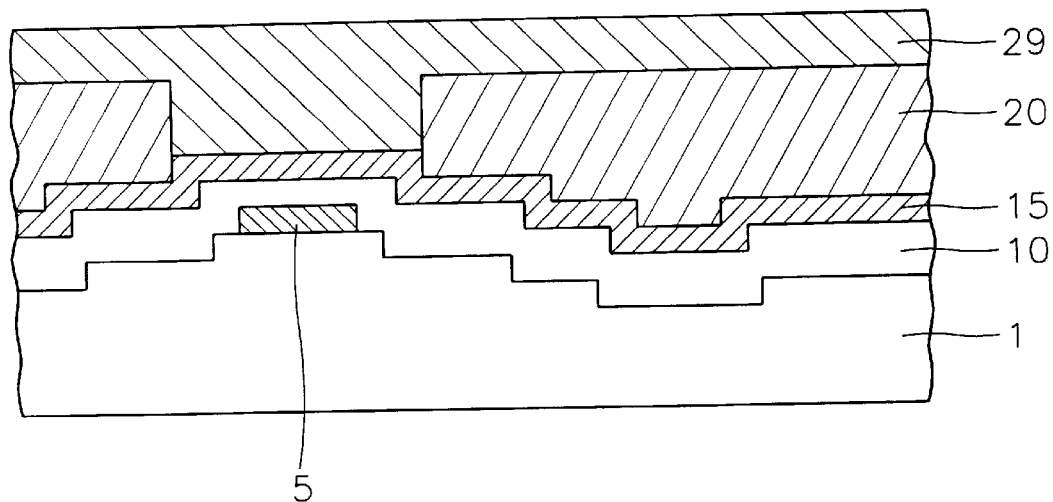
FIGS. 4A to 4D illustrate manufacturing steps of the thin film actuated mirror array in FIG. 2.
Figure 4B:
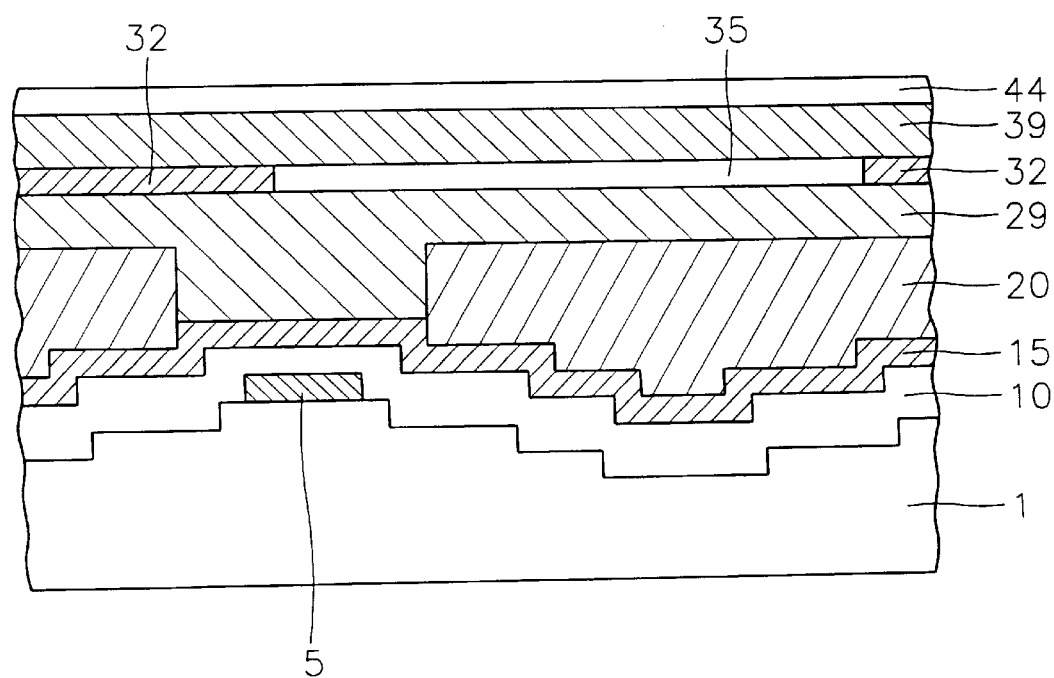
Figure 4C:
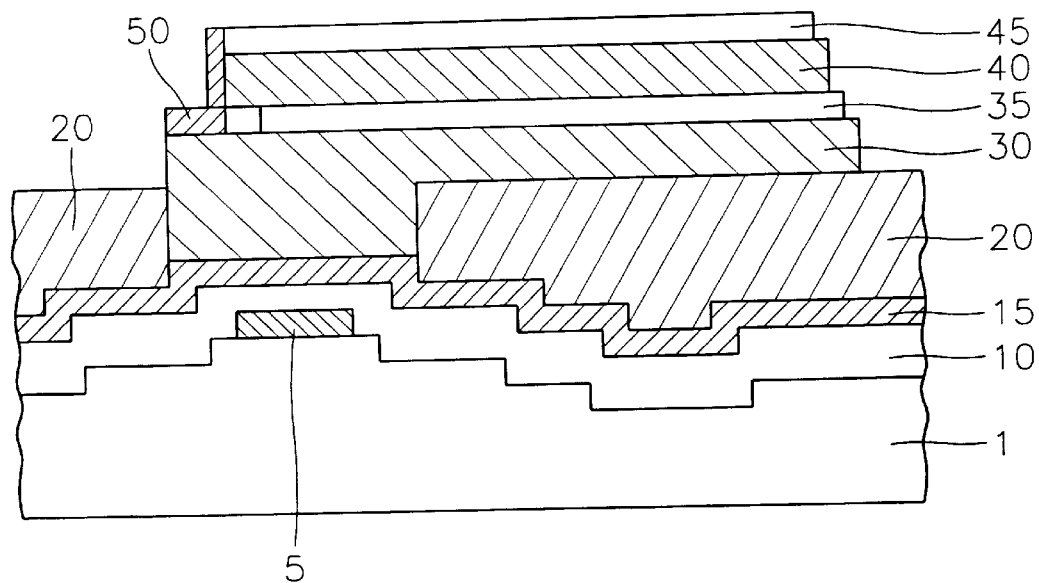
Figure 4D:
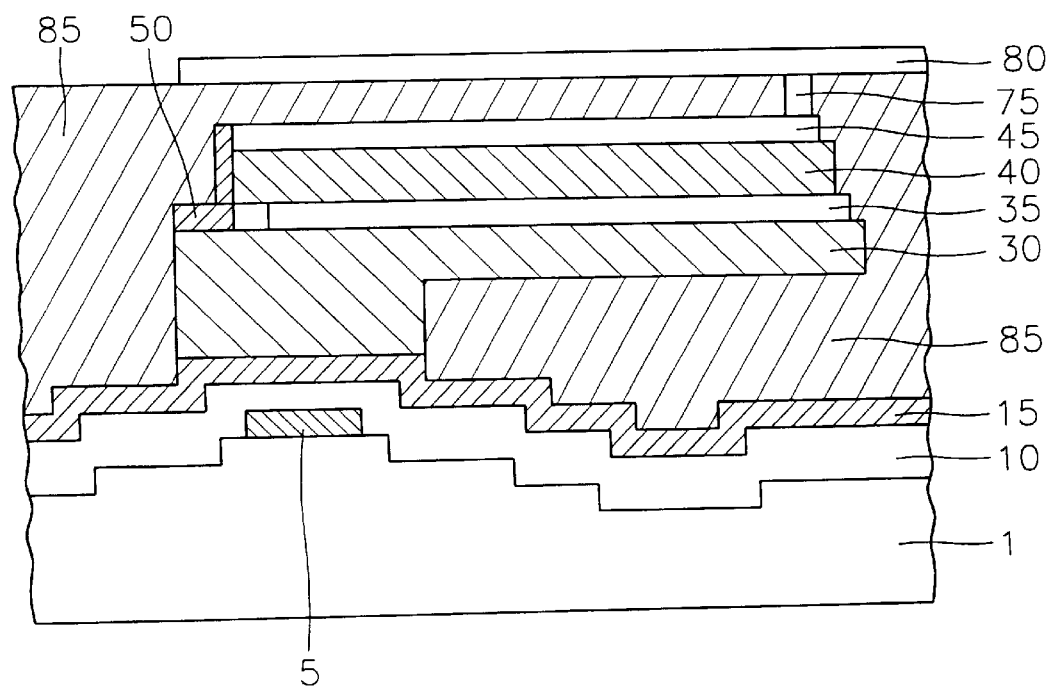
Figure 5:
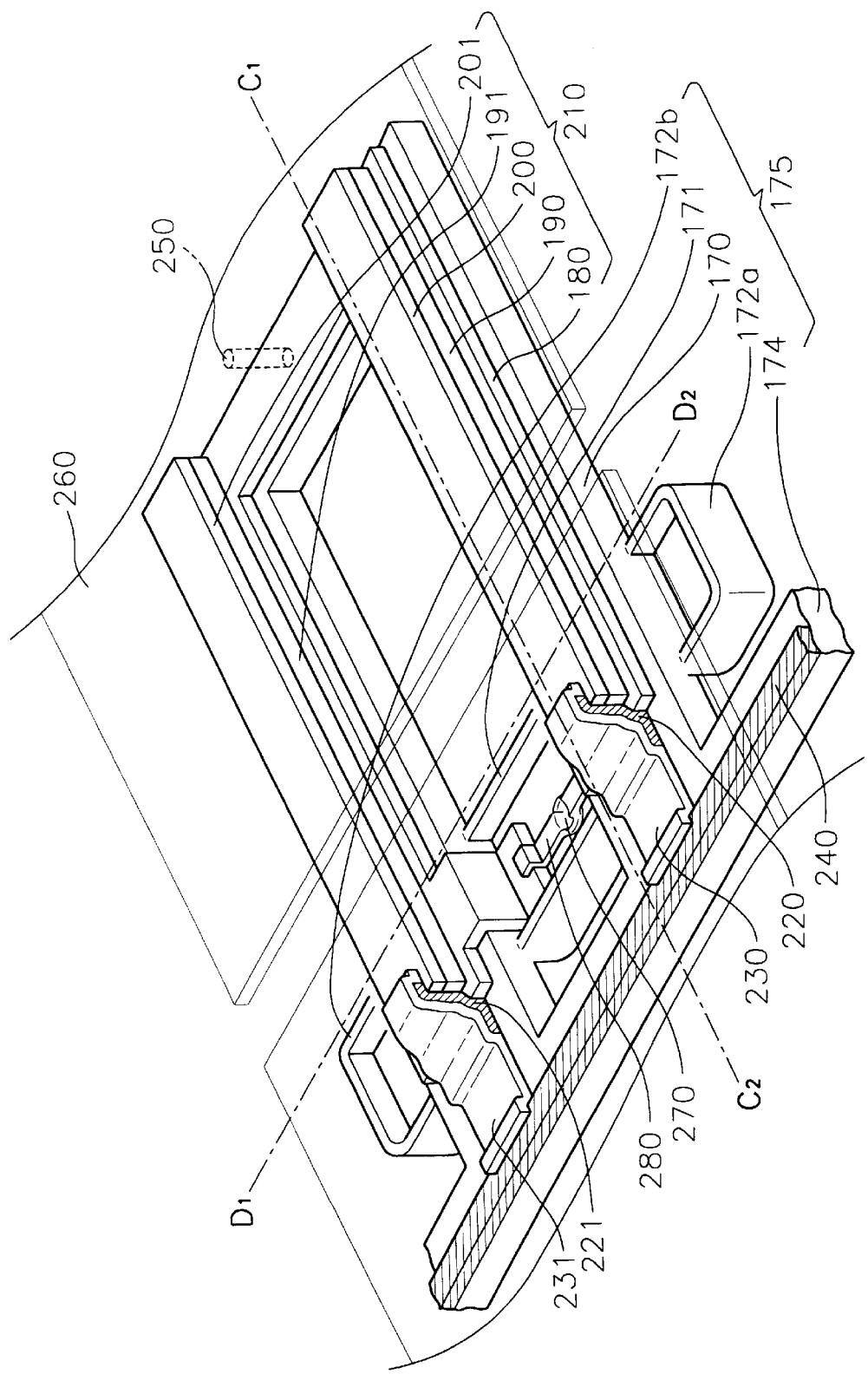
FIG. 5 is a perspective view for showing a thin film actuated mirror array according to a first embodiment of the present invention.
Figure 6:
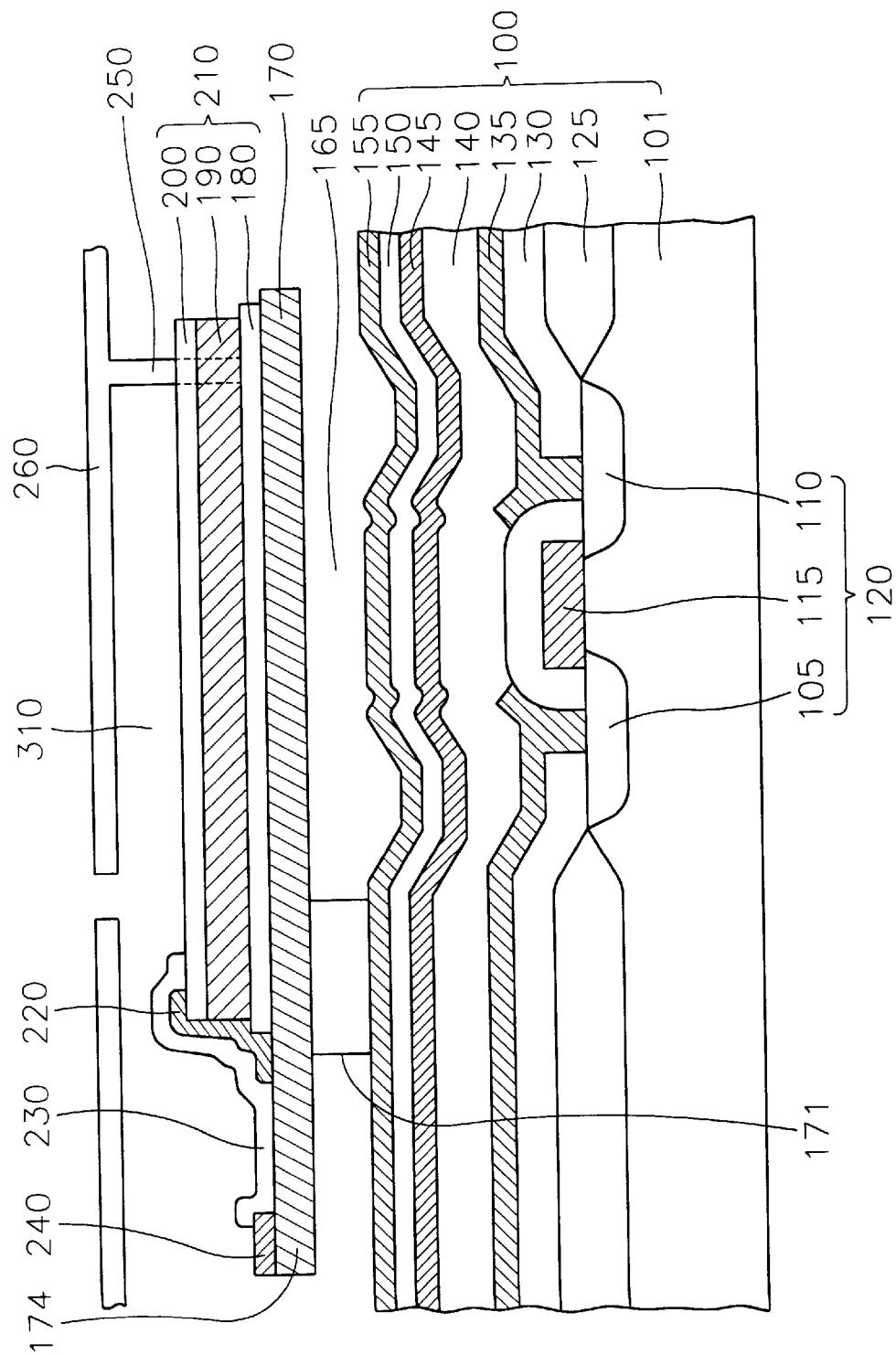
FIG. 6 is a cross-sectional view taken along line $C_1$–$C_2$ of FIG. 5.

FIG. 5 is a perspective view for showing a thin film actuated mirror array according to a first embodiment of the present invention, FIG. 6 is a cross-sectional view taken along line $C_1$–$C_2$ of FIG. 5, and FIG. 7 is a cross-sectional view taken along line $D_1$–$D_2$ of FIG. 5.

Referring to FIGS. 5 and 6, the thin film AMA according to the present embodiment has an active matrix 100, a supporting member 175 formed on the active matrix 100, an actuator 210 formed on the supporting member 175, and a reflecting member 260 formed above the actuator 210.

Referring to FIGS. 6 and 7, the active matrix 100 has a substrate 101 including M×N (M, N are integers) numbers of P-MOS transistors 120, a first metal layer 135 prolonged from a source 110 and from a drain 105 of the P-MOS transistor 120, a first passivation layer 140, a second metal layer 145, a second passivation layer 150, and an etching stop layer 155. The first metal layer 135 is formed on the substrate 101 and the first passivation layer 140 is formed on the first metal layer 135 and on the substrate 101. The second metal layer 145 is formed on the first passivation layer 140 and the second passivation layer 150 is formed on the second metal layer 145. The etching stop layer 155 is formed on the second passivation layer 150.

For transmitting a first signal (picture signal), the first metal layer 135 has a drain pad prolonged from the drain 105 of the P-MOS transistor 120 to a first anchor 171 which is formed beneath and between the actuator 210. The second metal layer 145 includes a titanium layer and a titanium nitride layer. A hole 147 is formed at a portion of the second metal layer 145 having the drain pad of the first metal layer 135 formed thereunder.

Referring to FIGS. 5 and 7, the supporting member 175 has a supporting line 174, a supporting layer 170, the first anchor 171 and two second anchors 172a, 172b. The supporting line 174 and the supporting layer 170 are formed above the etching stop layer 155. A first air gap 165 is interposed between the etching stop layer 155 and the supporting line 174. The first air gap 165 is also interposed between the etching stop layer 155 and the supporting layer 170.

A common line 240 is formed on the supporting line 174. The supporting line 174 supports the common line 240. Preferably, the supporting layer 170 has a rectangular ring shape. The supporting layer 170 is integrally formed with the supporting line 174.

The first anchor 171 is formed beneath and between two arms of the rectangular ring-shaped supporting layer 170. Those two arms of the supporting layer 170 are perpendicularly prolonged from the supporting line 174. The first anchor 171 is attached to a first portion of the etching stop layer 155 having the drain pad of the first metal layer 135 formed thereunder. The first anchor 171 is integrally formed with those two arms of the supporting layer 170. The two second anchors 172a, 172b are respectively formed beneath lateral portions of those two arms of the supporting layer 170. The second anchors 172a, 172b are also integrally formed with those two arms of the supporting layer 170. The second anchors 172a, 172b are respectively attached to a second portion of the etching stop layer 155 and to a third portion of the etching stop layer 155. The first anchor 171 and the two second anchors 172a, 172b are attached beneath portions of the supporting layer 170 which are adjacent to the supporting line 174. The first anchor 171 and the second anchors 172a, 172b together support the supporting layer 170, so the first anchor 171 and the second anchors 172a, 172b support the actuator 210. The first anchor 171 and the second anchors 172a, 172b respectively have box-shapes.

A central portion of the supporting layer 170 is supported by the first anchor 171 and lateral portions of the supporting layer 170 are supported by the second anchors 172a, 172b.

A via hole 270 is formed from the surface of the first anchor 171 to the drain pad of the first metal layer 135 through portions of the etching stop layer 155, the second passivation layer 150, the hole 147 of the second metal layer 145, and the first passivation layer 140.

The actuator 210 has a bottom electrode 180, a first active layer 190, a second active layer 191, a first top electrode 200, and a second top electrode 201.

The bottom electrode 180 has a reverse U-shape about the supporting line 174 and is formed on the supporting layer 170. the bottom electrode 180 is apart from the supporting line 174 by a predetermined interval. The bottom electrode 180 has protruding portions which are prolonged toward the first anchor 171 like stairs. The protruding portions of the bottom electrode 180 are prolonged to a portion of the first anchor 171 adjacent to the via hole 270. That is, the protruding portions of the bottom electrode 180 are correspondingly formed centering around the via hole 270.

A via contact 280 is formed from the drain pad of the first metal layer 135 to the protruding portions of the bottom electrode 180 through the via hole 270. The via contact 280 connects the bottom electrode 180 to the drain pad.

The first active layer 190 and the second active layer 191 are respectively formed on two arms of the reverse U-shaped bottom electrode 180. The first top electrode 200 and the second top electrode 201 are also respectively formed on the first active layer 190 and on the second active layer 191. The two arms of the reverse U-shaped bottom electrode 180 respectively have rectangular plate shapes. The first active layer 190 and the second active layer 191 respectively have rectangular plate shapes. In the present embodiment, lengths of the arms of the bottom electrode 180 are respectively longer than lengths of the first and the second active layers 190, 191 by first margins 330 as detail shown in FIG. 9. The first margin 330 is formed between one end of one arm of the bottom electrode 180 and one end of the first active layer 190. Also, the first margin 330 is formed between the other end of one arm of the bottom electrode 180 and the other end of the first active layer 190. Furthermore, the first margin 330 is formed between one end of the other arm of the bottom electrode 180 and one end of the second active layer 191, and the first margin 330 is also formed between the other end of the other arm of the bottom electrode 180 and the other end of the second active layer 191. However, the first top electrode 200 has the same size as that of the first active layer 190 and the second top electrode 201 has the same size as that of the second active layer 191 in the present embodiment.

A first insulating member 220 is formed from a portion of the first top electrode 200 to a portion of the supporting layer 170 which is adjacent the supporting line 174. A first top electrode connecting member 230 is formed from a portion of the first top electrode 200 to the common line 240 through the first insulating member 220. The first top electrode connecting member 230 connects the first top electrode 200 to the common line 240. The first insulating member 220 prevents the first top electrode 200 from connecting to the bottom electrode 180 so that the first insulating member 220 prevents an electrical short from occurring between the first top electrode 200 and the bottom electrode 180.

Also, a second insulating member 221 is formed from a portion of the second top electrode 201 to a portion of the supporting layer 170 which is adjacent the supporting line 174. A second top electrode connecting member 231 is formed from a portion of the second top electrode 201 to the common line 240 through the second insulating member 221. The second top electrode connecting member 231 connects the second top electrode 201 to the common line 240. The second insulating member 221 and the second top electrode connecting member 231 are respectively formed parallel to the first insulating layer 220 and the first top electrode connecting member 230. The second insulating member 221 prevents the second top electrode 201 from connecting to the bottom electrode 180 so that the second insulating member 221 prevents an electrical short from generating between the second top electrode 201 and the bottom electrode 180.

The post 250 is formed at a portion of the reverse U-shaped bottom electrode 180 except the two arms of the bottom electrode 180. That is, the post is formed at the portion of the bottom electrode 180 which is separate in parallel direction from the supporting line 174. The post 250 supports the reflecting member 260 which reflects the light incident from a light source (not shown). Preferably, the reflecting member 260 has a rectangular shape. A central portion of reflecting member 260 is supported by the post 250. Lateral portions of the reflecting member 260 are parallely formed above the actuator 210. A second air gap 310 is interposed between the lateral portions of reflecting member 260 and the actuator 210. The reflecting member 260 is tilted according to the actuating of the actuator 210, so the reflecting member 260 reflects the light incident from the light source by a predetermined angle.

A method for manufacturing the thin film AMA according to the present embodiment will be described as follows.

FIGS. 8A to 8F illustrate manufacturing steps of the thin film AMA according to the present embodiment. In FIGS. 8A to 8F, the same reference numerals are used for the same elements in FIGS. 6 and 7.

Figure 8A:
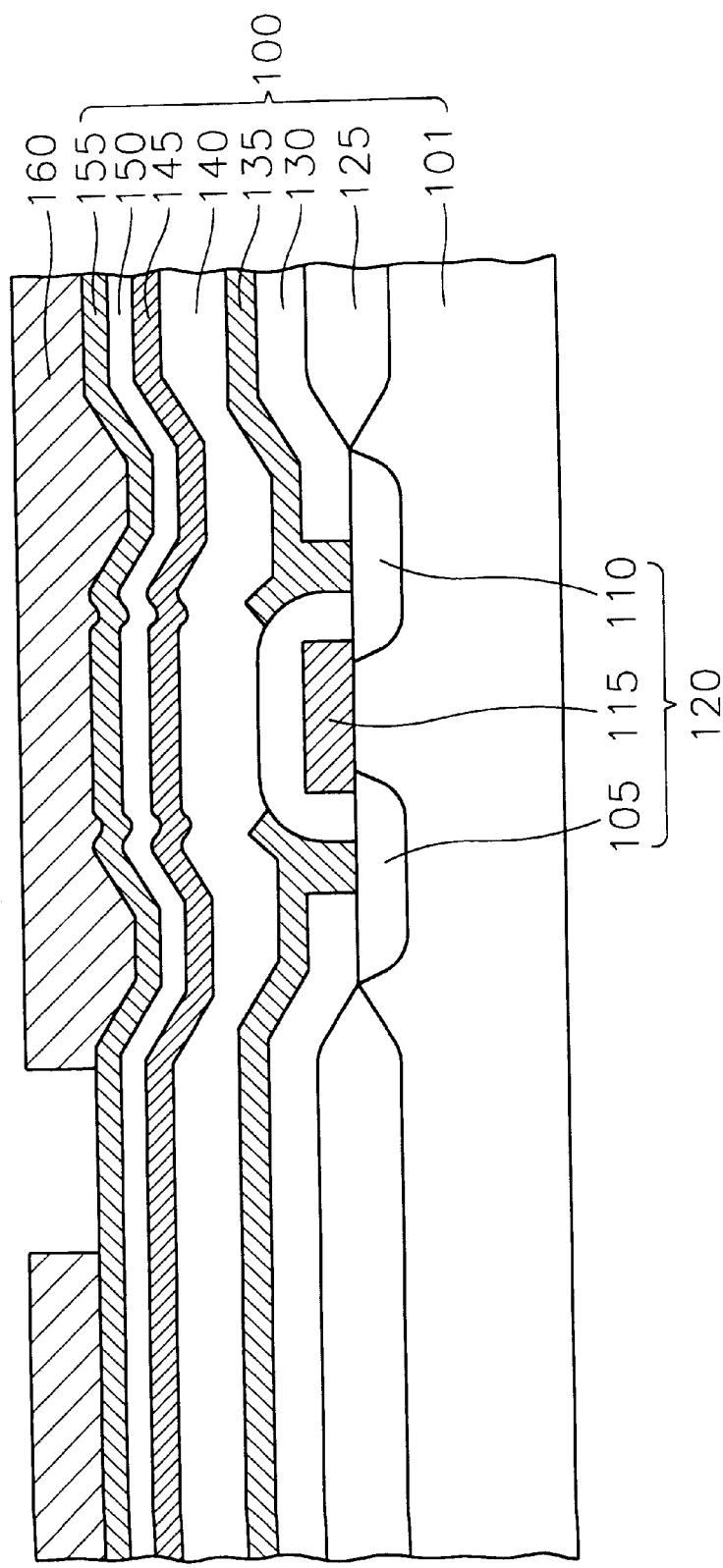
FIGS. 8A to 8F illustrate manufacturing steps of the thin film actuated mirror array according to the first embodiment of the present invention.

Referring to FIG. 8A, an isolating layer 125 is formed on the substrate 101 in order to separate an active region and a field region in the substrate 101 by a local oxidation of silicon method after the substrate 101 composed of silicon is provided. Preferably, the substrate 101 is an N-typed silicon wafer. Subsequently, M×N (M and N are integers) numbers of P-typed metal oxide semiconductor (MOS) transistors 120 are completed according as the P$^+$ source 110 and the P$^+$ drain 105 are formed on the active region after a gate 115 is formed between the source 110 and the drain 105. The P-MOS transistor 120 receives the first signal from outside and performs a switching operation.

After an insulating layer 130 is formed on the substrate 101 having the P-MOS transistor 120 formed therein, openings are respectively formed at portions of the insulating layer 130 having drain 105 and the source 110 formed thereunder so as to expose the portions of the drain 105 and the source 110. After a layer composed of titanium (Ti), titanium nitride (TiN), tungsten (W), and a nitride is formed on the insulating layer 130 having the openings, the layer is patterned to form the first metal layer 135. To transmit the first signal, the first metal layer 135 has a drain pad prolonged from the drain 105 of the PMOS transistor 120 to the first anchor 171.

The first passivation layer 140 is formed on the first metal layer 135 and on the substrate 101. The first passivation layer 140 is formed by using phosphor-silicate glass (PSG). The first passivation layer 140 is formed by chemical vapor deposition (CVD) method so that the first passivation layer 140 has a thickness of from 8000 to 9000 Å. The first passivation layer 140 protects the substrate 101 having the P-MOS transistor 120 during subsequent manufacturing steps.

The second metal layer 145 is formed on the first passivation layer 140. The second metal layer 145 is composed of a titanium layer and a titanium nitride layer. For forming the second metal layer 145, at first, the titanium layer is formed on the first passivation layer 140 by sputtering method so that the titanium layer has a thickness of from 300 to 500 Å. Next, the titanium nitride layer is formed on the titanium layer by physical vapor deposition (PVD) method so that the titanium nitride layer has a thickness of from 1000 to 1200 Å. The second metal layer 145 excludes the light incident upon the substrate 101, so the second metal layer 145 prevents a photo leakage current from flowing through the substrate 101. Then, a portion of the second metal layer 145 having the drain pad formed thereunder is etched so as to form a hole 147. The hole 147 isolates the via contact 280 from the second metal layer 145.

The second passivation layer 150 is formed on the second metal layer 145. The second passivation layer 150 is formed by using PSG. The second passivation layer 150 is formed by CVD method so that the second passivation layer 150 has a thickness of from 2000 to 3000 Å. The second passivation layer 150 protects the second metal layer 145 and the resultant layers formed on the substrate 101 during subsequent manufacturing steps.

The etching stop layer 155 is formed on the second passivation layer 150 by using a low temperature oxide (LTO) such as silicon dioxide ($SiO_2$) or phosphorus pentoxide ($P_2O_5$). The etching stop layer 155 is formed by low pressure CVD (LPCVD) method under a temperature of from 350 to 450° C. so that the etching stop layer 155 has a thickness of from 0.2 to 0.8 μm. The etching stop layer 155 protects the second passivation layer 150 and the resultant layers formed on the substrate 101 during subsequent etching steps. As a result, the active matrix 100 is completed, which is composed of the substrate 101, the first metal layer 135, the first passivation layer 140, the second metal layer 145, the second passivation layer 150, and the etching stop layer 155.

A first sacrificial layer 160 is formed on the etching stop layer 155 by using poly silicon below a temperature of about 500° C. The first sacrificial layer 160 is formed by LPCVD method so that the first sacrificial layer 160 has a thickness of from 2.0 to 3.0 μm. In this case, the degree of flatness of the first sacrificial layer 160 is poor because the first sacrificial layer 160 covers the top of the active matrix 100 having the MOS transistor 120 and the resultant layers. Therefore, the surface of the first sacrificial layer 160 is planarized by using spin on glass (SOG) or by chemical mechanical polishing (CMP) method so that the first sacrificial layer 160 has a thickness of about 1.1 μm.

Figure 8B:
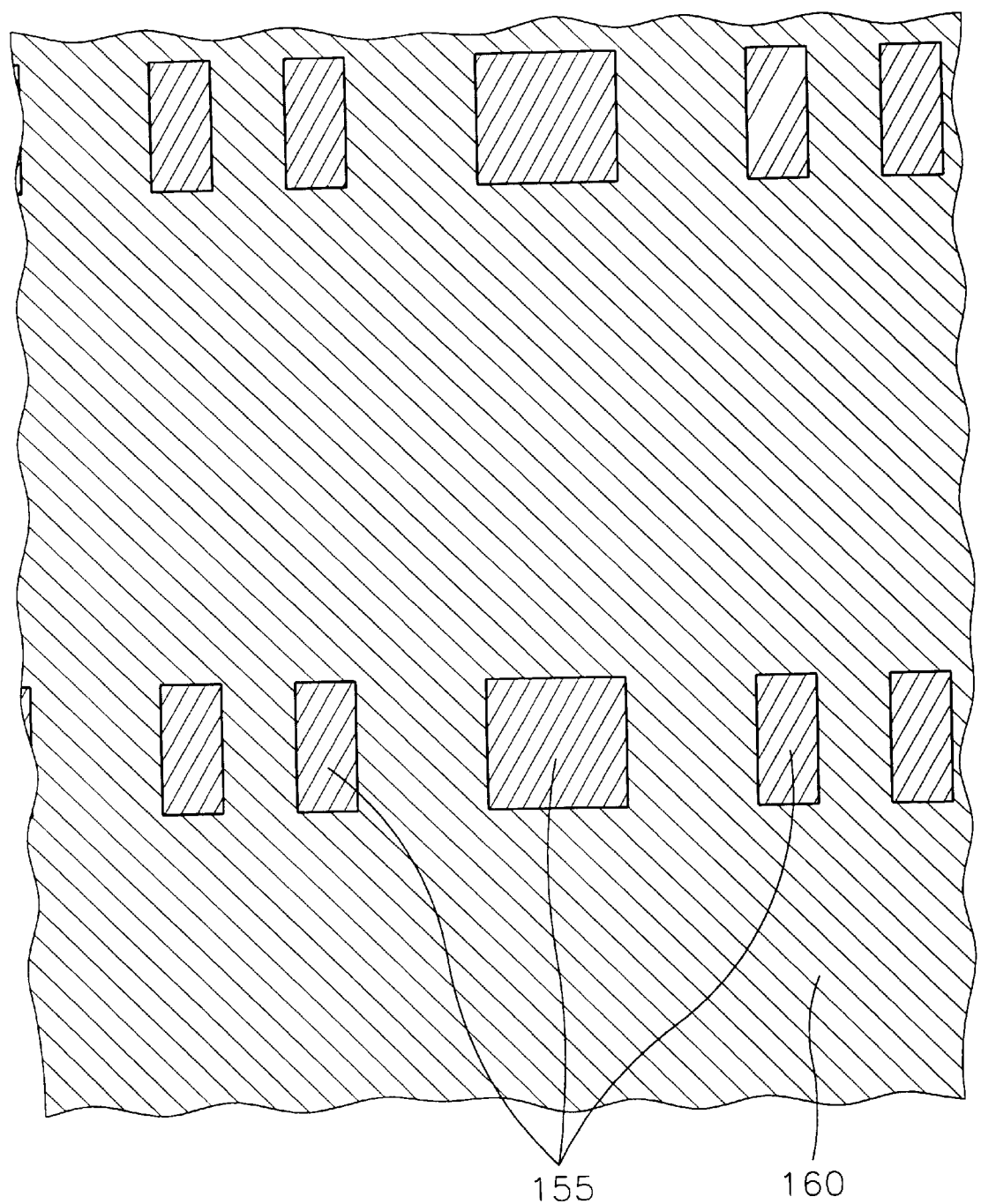

FIG. 8B illustrates a plan view for showing the patterned first sacrificial layer 160.

Referring to FIGS. 8A and 8B, after a first photo resist (not shown) is coated on the first sacrificial layer 160 and is patterned, a first portion of the first sacrificial layer 160 having the hole 147 of the second metal layer 145 formed thereunder and a second and a third portion of the first sacrificial layer 160 adjacent to the first portion are etched to expose portions of the etching stop layer 155. The first anchor 171 and the second anchors 172a, 172b will be formed at the exposed portions of the etching stop layer 155. These exposed portions of the etching stop layer 155 respectively have rectangular shapes which are separated by predetermined intervals. Then, the first photo resist is removed.

Figure 8C:
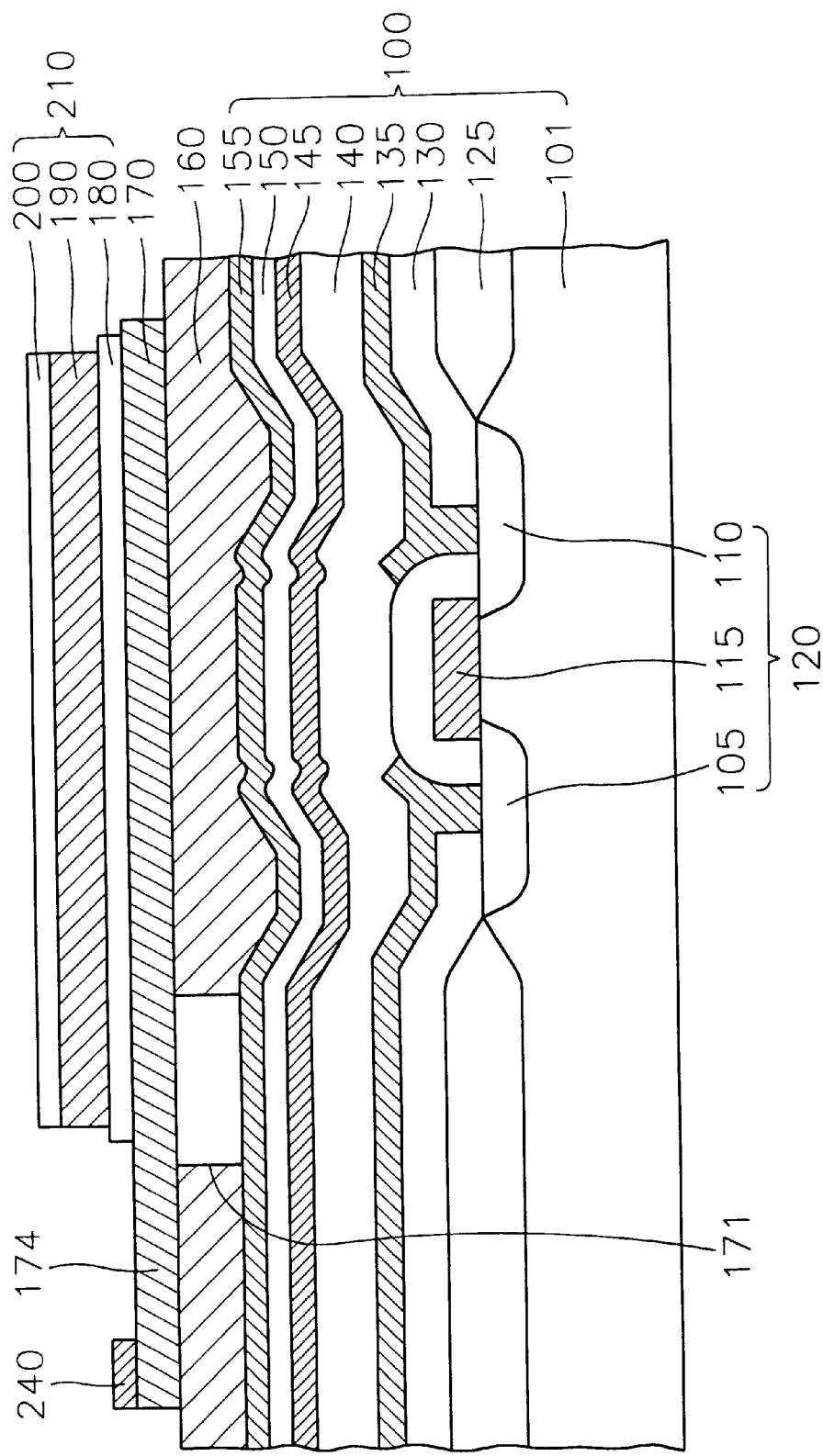

Referring to FIG. 8C, a first layer 169 is formed on those exposed portions of the etching stop layer 155 which have rectangular shapes and on the first sacrificial layer 160. The first layer 169 is formed by using a rigid material such as nitride or metal. The first layer 169 is formed by LPCVD method so that the first layer 169 has a thickness of from 0.1 to 1.01 m. The first layer 169 will be patterned so as to form the supporting member 175 having the supporting layer 170, the supporting line 174, the first anchor 171 and the two second anchors 172a, 172b. At that time, the first anchor 171 is located at the center of the exposed portions of the etching stop layer 155 and two second anchors 172a, 172b are respectively located at other exposed portions of the etching stop layer 155.

A bottom electrode layer 179 is formed on the first layer 169. The bottom electrode layer 179 is formed by using electrically conductive metal such as platinum (Pt), tantalum (Ta) or platinum-tantalum (Pt-Ta). The bottom electrode layer 179 is formed by sputtering method or CVD method so that the bottom electrode layer 179 has a thickness of about 1300 to about 2700 Å. The bottom electrode layer 179 will be patterned to form the bottom electrode 180 having the protruding portions which are opposed to each other.

A second layer 189 is formed on the bottom electrode layer 179. The second layer 189 is formed by using piezoelectric material such as ZnO, PZT ($Pb(Zr, Ti)O_3$) or PLZT (($Pb, La)(Zr, Ti)O_3$) and by sol-gel method, sputtering method, spin coating method or CVD method so that the second layer 189 has a thickness of about 3000 to about 4000 Å. Preferably, the second layer 189 is formed by the spin coating method and by using the ZnO. Then, the second layer 189 is annealed by rapid thermal annealing (RTA) method. The second layer 189 will be patterned to form the first active layer 190 and the second active layer 191.

A top electrode layer 199 is formed on the second layer 189. The top electrode layer 199 is formed by using an electrically conductive metal, for example, tantalum, platinum or silver (Ag). The top electrode layer 199 is formed by sputtering method or CVD method so that the top electrode layer 199 has a thickness of about 500 Å. The top electrode layer 199 will be patterned so as to form the first top electrode 200 and the second top electrode 201.

Subsequently, after a second photo resist (not shown) is coated on the top electrode layer 199 by spin coating method, the top electrode layer 199 is patterned so as to form the first top electrode 200 and the second top electrode 201 which respectively have rectangular shapes (see FIG. 5) by using the second photo resist as an etching mask. The first top electrode 200 and the second top electrode 201 are formed parallel to each other. A second signal (bias signal) is applied to the first top electrode 200 and to the second top electrode 201 through the common line 240. Then, the second photo resist is removed.

Figure 9:
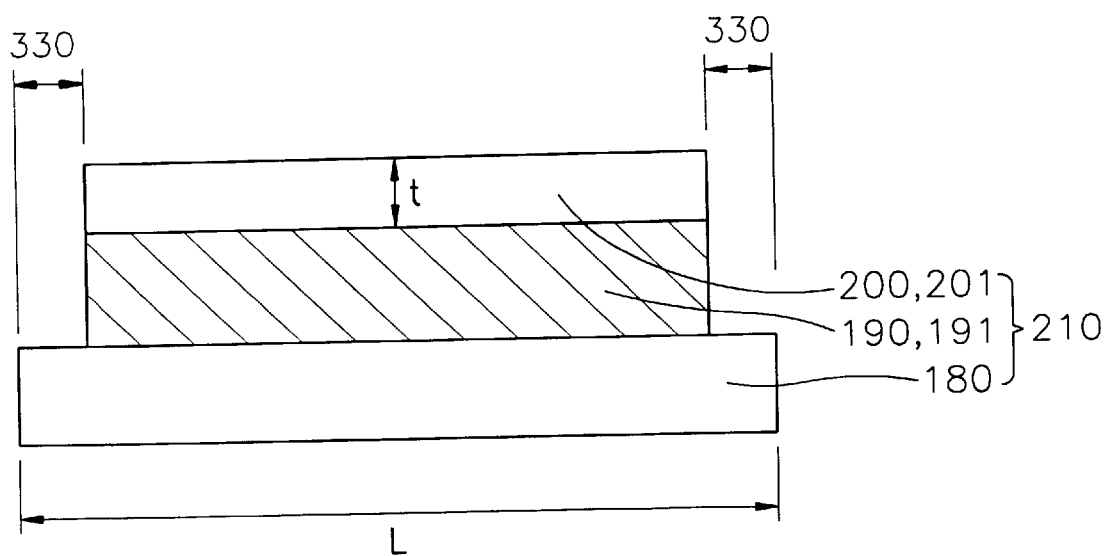
FIG. 9 is a schematic magnified cross-sectional view of the actuator in FIG. 6.

The second layer 189 is patterned to form the first active layer 190 and the second active layer 191 by the same process of the top electrode layer 199. The first active layer 190 and the second active layer 191 are also formed parallel to each other. The first active layer 190 and the second active layer 191 respectively have rectangular shapes which have the same sizes as those of the first top electrode 200 and the second top electrode 201 as shown in FIGS. 7 and 9.

The bottom electrode layer 179 is patterned to form the bottom electrode 180 having the protruding portions by the same process of the top electrode layer 199. The bottom electrode 180 has the reverse U-shaped about the supporting line 174 which is formed soon after. The two arms of the reverse U-shaped bottom electrode 180 are respectively longer than the first active layer 190 and the second active layer 191 by first margins 330 as shown in FIG. 9.

When the bottom electrode layer 179 is patterned, the common line 240 is simultaneously formed at a portion of the first layer 169 which will be patterned to form the supporting line 174. The common line 240 is formed in the direction perpendicular to the bottom electrode 180 as shown in FIG. 5. The common line 240 is separated from the bottom electrodes 180 by a predetermined interval, so the common line 240 does not contact with the bottom electrode 180. As a result, the actuator 210 is completed.

Subsequently, the first layer 169 is patterned to form the supporting member 175 having the supporting layer 170, the supporting line 174, the first anchor 171 and the two second anchors 172a, 172b. In this case, among the first layer 169 attached to the exposed portions of the etching stop layer 155, the first anchor 171 is located at the center of the exposed portion of the etching stop layer 155 and two second anchors 172a, 172b respectively locate on the other exposed portions of the etching stop layer 155. The hole 147 of the second metal layer 145 is formed under the first anchor 171. The supporting layer 170 has the rectangular ring shape and is integrally formed with the supporting line 174 which is formed above the etching stop layer 155. The supporting member 175 is completed as shown in FIG. 6 when the first sacrificial layer 160 is removed.

The first anchor 171 is formed beneath and between those two arms of the rectangular ring-shaped supporting layer 170. The two arms of the supporting layer 170 are perpendicularly prolonged from the supporting line 174. The first anchor 171 is attached to the center of the exposed portion of the etching stop layer 155, a first exposed portion of the etching stop layer 155, having the drain pad of the first metal layer 135 formed thereunder. The first anchor 171 is integrally formed with the two arms of the supporting layer 170. The two second anchors 172a, 172b are respectively formed beneath outsides of two arms of the supporting layer 170.

The second anchors 172a, 172b are also integrally formed with the two arms of the supporting layer 170 and are respectively attached to the second and the third exposed portions of the etching stop layer 155. The first anchor 171 and the second anchors 172a, 172b are respectively attached beneath the portions of the supporting layer 170 which are adjacent to the supporting line 174. The reversed U-shaped bottom electrode 180 is formed on the rectangular ring-shaped the supporting layer 170. Hence, the first anchor 171 is formed beneath and between the bottom electrode 180, and the second anchors 172a, 172b are respectively formed beneath lateral portions of the bottom electrode 180.

The first anchor 171 and the second anchors 172a, 172b together support the supporting layer 170, so the first anchor 171 and the second anchors 172a, 172b support the actuator 210.

Figure 8D:
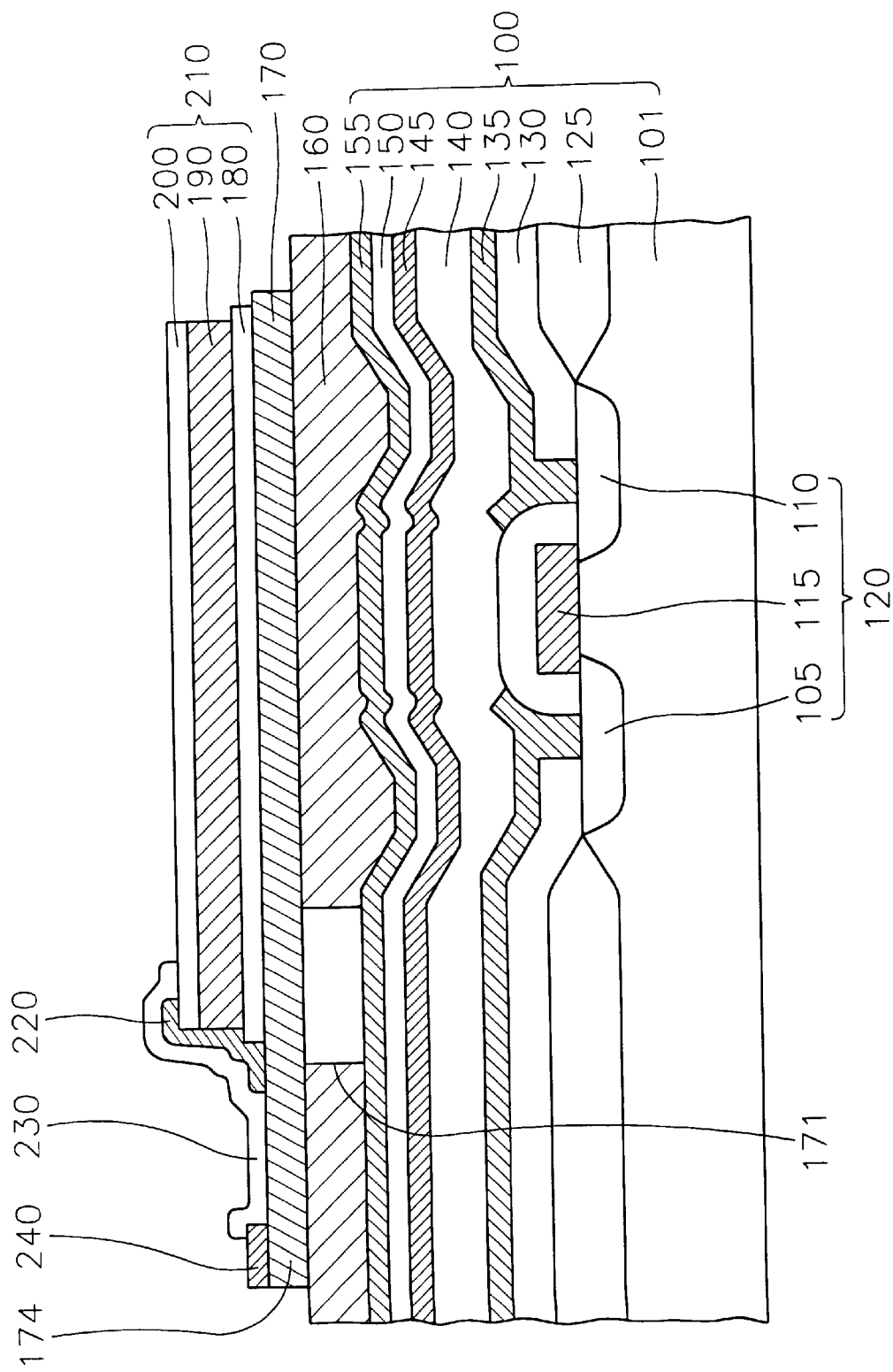

Referring to FIG. 8D, after a third photo resist (not shown) is coated on the supporting member 175 and on the actuator 210, the third photo resist is patterned to expose portions of the common line 240, the supporting member 175, the first top electrode 200, and the second top electrode 201. At that time, the protruding portions of the bottom electrode 180 are simultaneously exposed.

Subsequently, the first insulating member 220 and the second insulating member 221 are formed by patterning LTO such as silicon dioxide or phosphorus pentoxide, after the LTO is formed on the exposed portions of the supporting member 175, the first top electrode 200, and the second top electrode 201 by LPCVD method. The first insulating member 220 is formed from a portion of the first top electrode 200 to a portion of the supporting layer 170 through portions of the first active layer 190 and the bottom electrode 180. The second insulating member 221 is also formed from a portion of the second top electrode 200 to a portion of the supporting layer 170 through portions of the second active layer 190 and the bottom electrode 180. The first insulating member 220 and the second insulating member 221 respectively have thicknesses of about 0.2 to 0.4 $\mu$m.

Figure 8E:
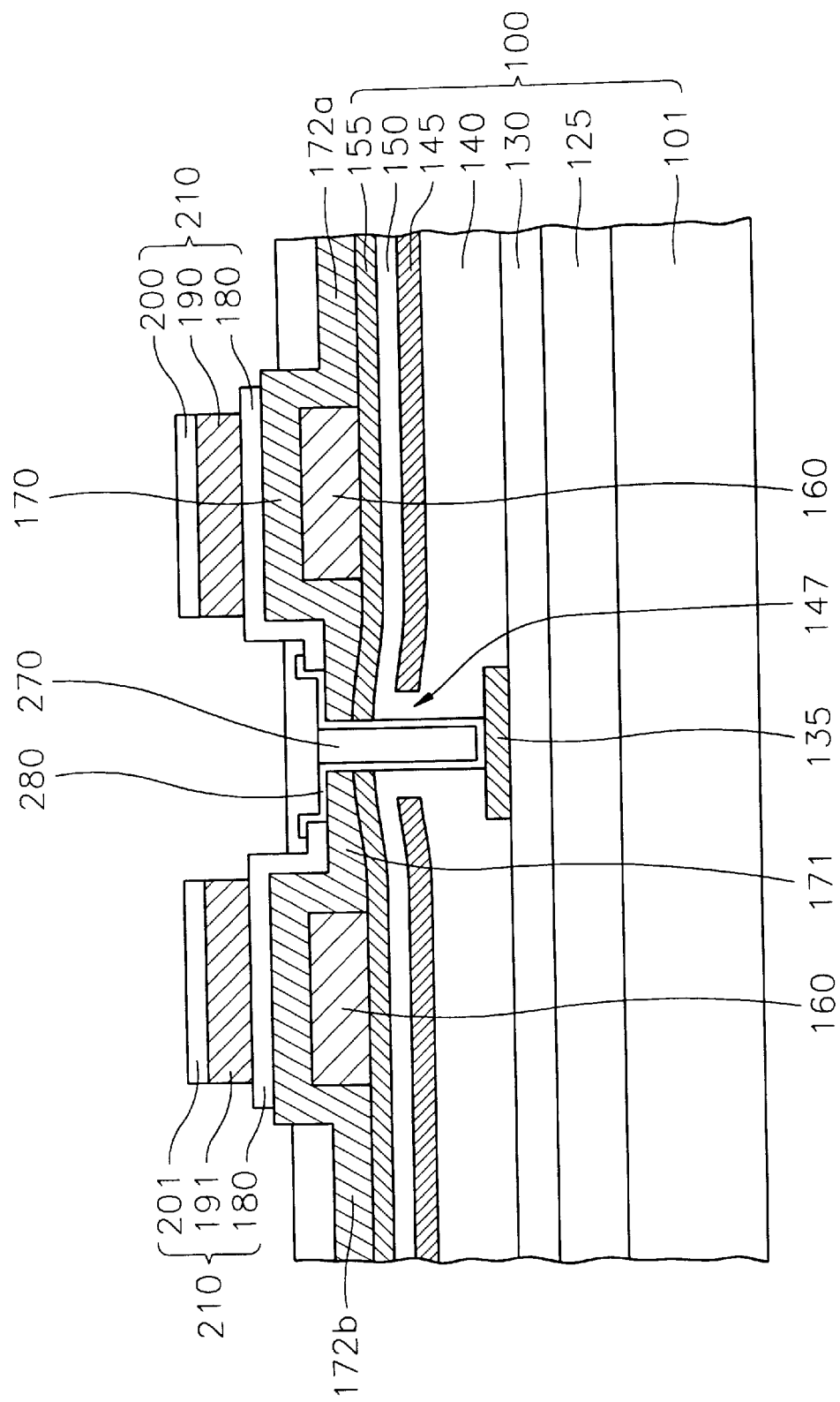

FIG. 8E illustrates a cross-sectional view for showing the via contact 280. Referring to FIGS. 8D and 8E, the via hole 270 is formed from the first anchor 171 to the drain pad of the first metal layer 135 through the hole 147 of the second metal layer 145 by etching portions of the etching stop layer 155, the second passivation layer 150, and the first passivation layer 140. Then, the via contact 280 is formed from the drain pad of the first metal layer 135 to the protruding portions of the bottom electrodes 180 through the via hole 270. Hence, the bottom electrode 180 is connected to the drain pad through the via contact 280. At the same time, the first top electrode connecting member 230 is formed from the common line 240 to a portion of the first top electrode 200 through the first insulating member 220 and the supporting layer 170. The second top electrode connecting member 231 is also formed from the common line 240 to a portion of the second top electrode 201 through the second insulating member 221 and the supporting layer 170 as shown in FIG. 5. The first top electrode connecting member 230 and the second top electrode connecting member 231 are formed parallel to each other.

The via contact 280, the first top electrode connecting member 230 and the second top electrode connecting member 231 are formed by using electrically conductive metals such as platinum, tantalum, or platinum-tantalum and by sputtering method or CVD method. The via contact 280, the first top electrode connecting member 230 and the second top electrode connecting member 231 respectively have thicknesses of about 0.1 to 0.2 $\mu$m. The first top electrode connecting member 230 and the second top electrode connecting member 231 respectively connect the common line 240 to the first top electrode 200 and to the second top electrode 201.

Figure 8F:
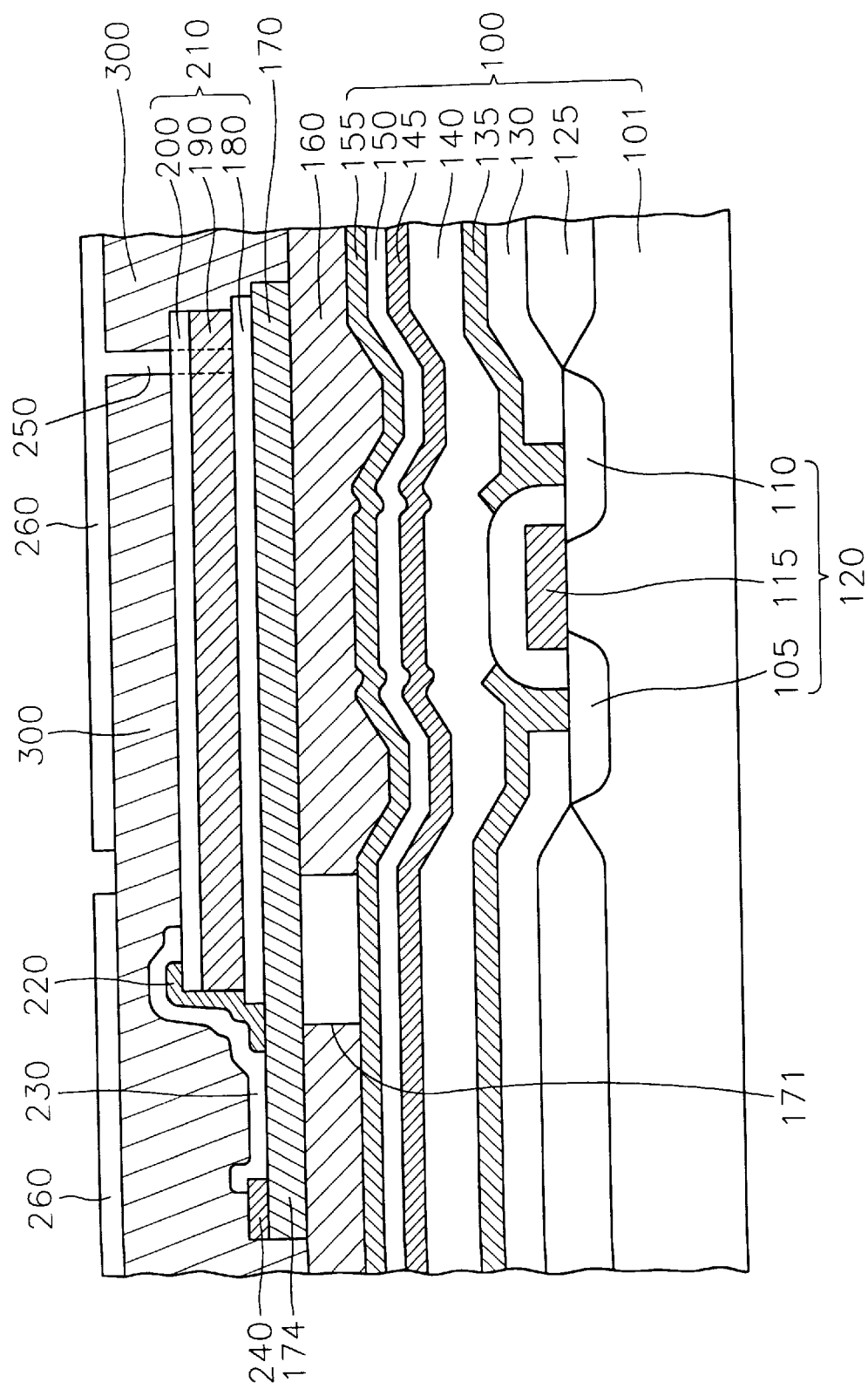

Referring to FIG. 8F, a second sacrificial layer 300 is formed on the actuator 210 and on the supporting member 175. The second sacrificial layer 300 is formed by using poly-silicon and by LPCVD method. The second sacrificial layer 300 sufficiently covers the actuator 210. Then, the surface of the second sacrificial layer 300 is planarized by CMP method so that the second sacrificial layer 300 has an level surface.

Subsequently, a portion of the second sacrificial layer 300 is etched to expose a portion of the reverse U-shaped bottom electrode 180 which is apart in parallel direction to the supporting line 174. Namely, the portion of the bottom electrode 180 where the first top electrode 200 and the second top electrode 201 are not formed is exposed. The post 250 and the reflecting member 260 are simultaneously formed by patterning a metal having reflectivity such as silver, platinum, or aluminum alloy after the metal having a thickness of about 0.1 to 1.01 m is formed on the exposed portion of the bottom electrode 180 and on the sacrificial layer 300 by sputtering method or CVD method.

Preferably, the reflecting member 260 has a square shape. The central portions of the reflecting member 260 is supported by the post 250 and lateral portions of the reflecting member 260 are parallely formed above the actuator 210.

Therefore, the thin film AMA shown in FIG. 5 is complete by rinsing and drying after the first sacrificial layer 160 and the second sacrificial layer 300 are removed by using bromine fluoride ($BrF_3$ or $BrF_5$) vapor or xenon fluoride ($XeF_2$, $XeF_4$ or $XeF_6$) vapor. A second air gap 310 is formed at the position where the second sacrificial layer 300 is located and the first air gap 165 is formed at the position where the first sacrificial layer 160 is located.

The operation of the thin film AMA according to the present embodiment will be described.

In the thin film AMA according to the present embodiment, the first signal is applied from outside to the bottom electrode 180 through the MOS transistor 120, the drain pad, and the via contact 280. At the same time, the second signal is applied from outside to the first and the second top electrodes 200, 201 through the common line 240 and the first and the second top electrode connecting members 230, 231. Thus, a first electric field is generated between the first top electrode 200 and the bottom electrode 180 and a second electric field is generated between the second top electrode 201 and the bottom electrode 180. The first active layer 190 formed between the first top electrode 200 and the bottom electrode 180 is deformed by the first electric field and the second active layer 191 formed between the second top electrode 201 and the bottom electrode 180 is deformed by the second electric field. The first and the second active layers 190, 191 are respectively deformed in the directions perpendicular to the first and the second electric fields. The actuator 210 having the first active layer 190 and the second active layer 191 is actuated in the opposite direction to the position where the supporting layer 170 is located. That is, the actuator 210 is tilted upward.

The reflecting member 260 reflecting the light incident from the light source is tilted with the actuator 210. Hence, the reflecting member 260 reflects the light onto the screen, so the picture is projected on the screen.

The simulation characteristics of the tilting angle of the actuator according to the present embodiment will be described.

Figure 10A:
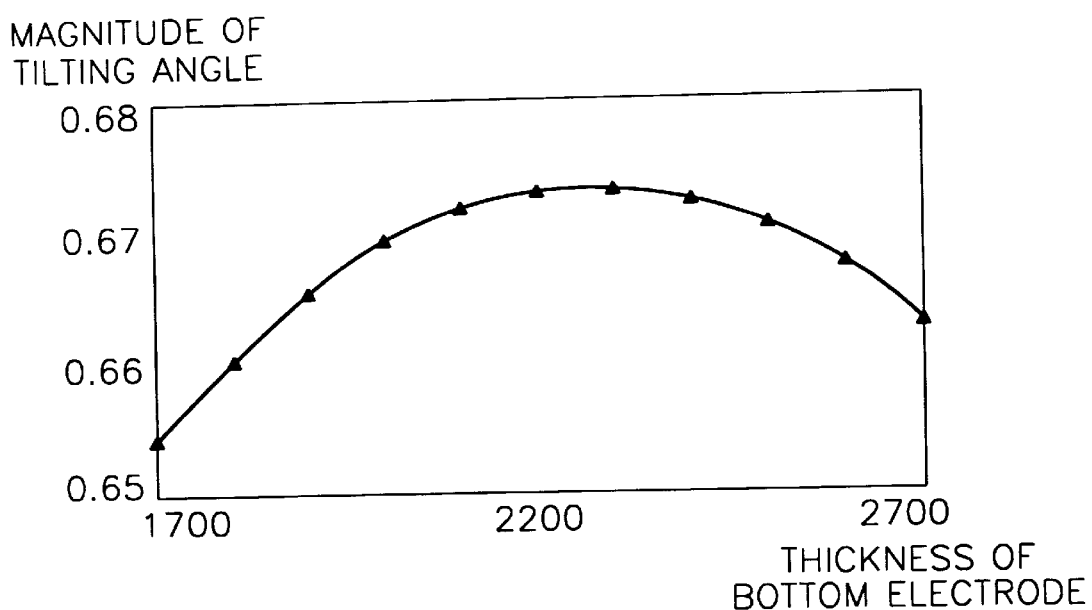
FIGS. 10A and 10B are simulation graphs for showing specific tilting angles of the actuator according to the first embodiment of the present invention.
Figure 10B:
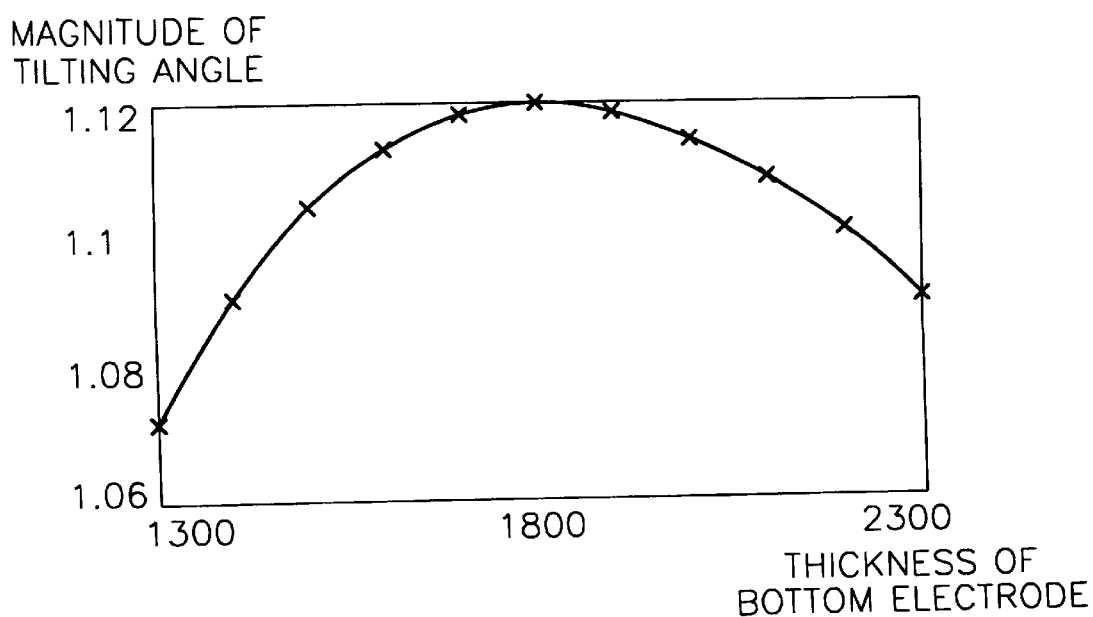

FIG. 9 is a schematic magnified cross-sectional view of the actuator in FIG. 6 and FIGS. 10A and 10B are simulation graphs for showing specific tilting angles of the actuator according to the present embodiment.

In the present embodiment, the length of the actuator 210 is about 50 μm, the thicknesses of the first and the second top electrodes 200, 201 are about 500Å respectively, the thicknesses of the first and the second active layers 190, 191 are about 3000 Å or about 4000 Å respectively, and the bottom electrode 180 has a thickness of about 1300 to 2700 Å. The actuator 210 is tilted when the bottom electrode 180 receives a voltage of about 10 V, and the first and the second top electrodes 200, 201 respectively receive voltages of about 0 V.

Referring to FIG. 9, when the first and the second top electrodes 200, 201 respectively have thicknesses of t's, the bottom electrode 180 has a thickness of about 2.6 to 5.4 t, and the first and the second active layer 190, 191 respectively have thicknesses of about 6.0 t or 8.0. Also, the first margins 330 respectively have lengths of about 0.1 to 0.02 L when the lengths of the two arms of the bottom electrode 180 are respectively L's.

The first and the second active layer 190, 191 respectively have thicknesses of about 3000 Å in FIG. 10A and the thicknesses of the first and the second active layer 190, 191 are about 4000 Å in FIG. 10B.

The maximum tilting angle of the actuator 210 is about 0.68° as shown in FIG. 10A and the maximum tilting angle of the actuator 210 is about 1.12° as shown in FIG. 10B.

Embodiment 2

Figure 11:
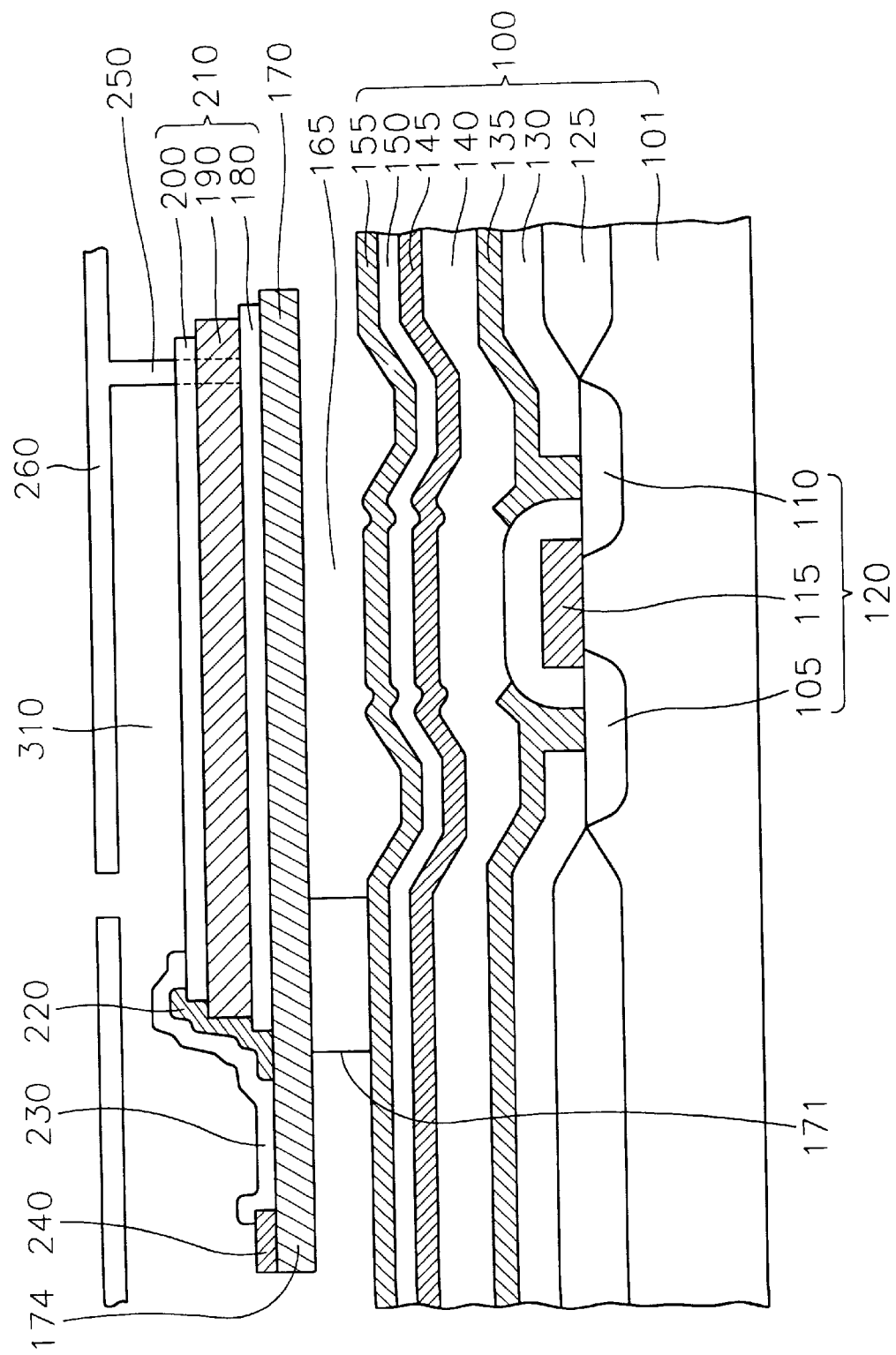
FIG. 11 is a cross-sectional view for showing a thin film actuated mirror array according to a second embodiment of the present invention.
Figure 12:
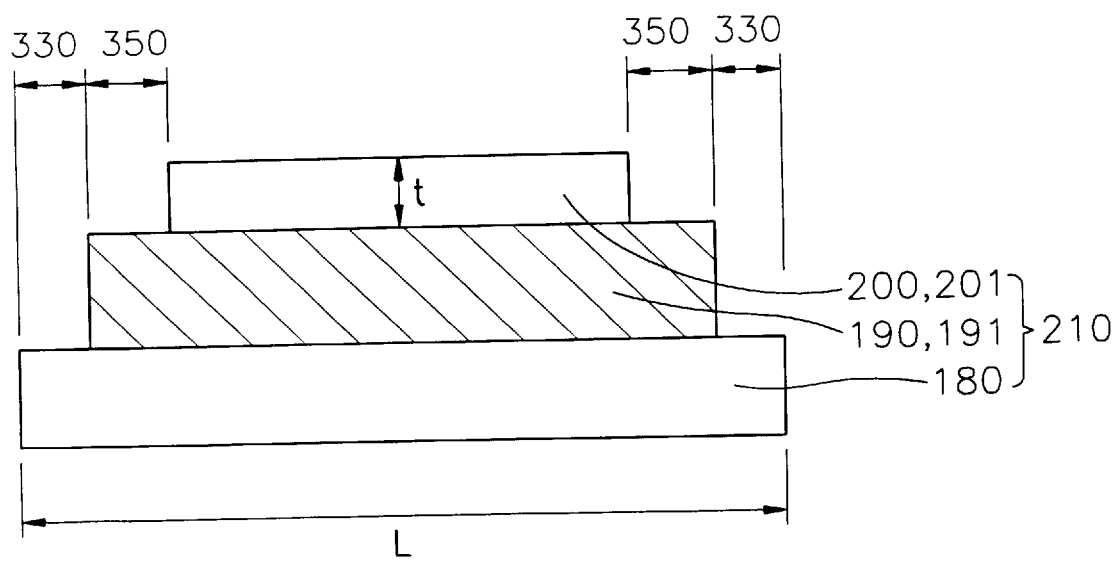
FIG. 12 is a schematic magnified view of the actuator in FIG. 11.
Figure 13A:
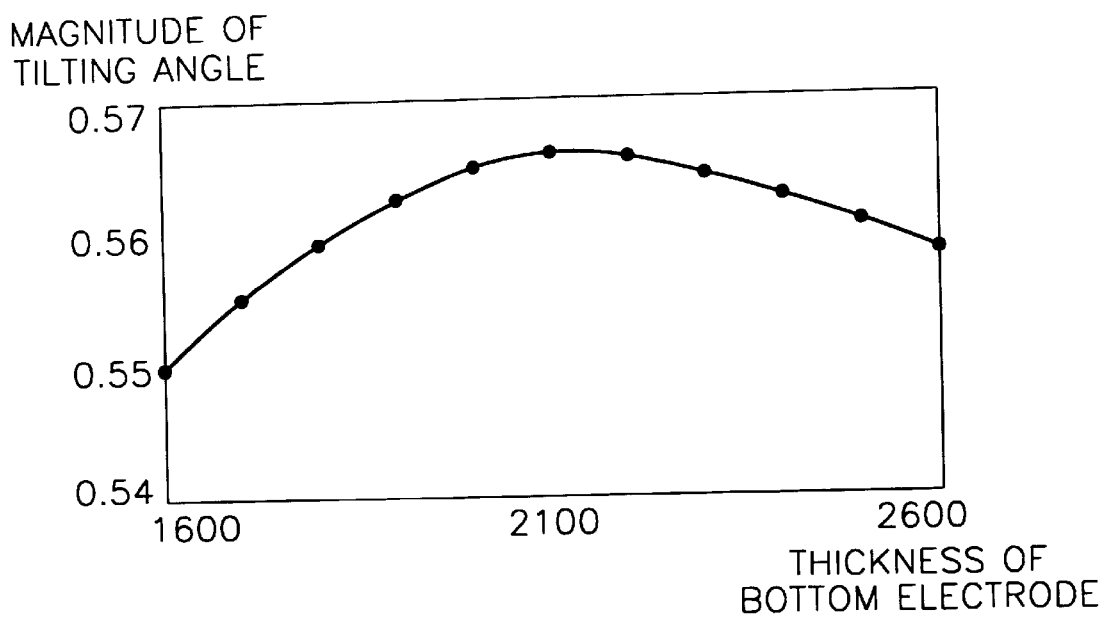
FIGS. 13A and 13B are simulation graphs for showing specific tilting angles of the actuator according to the second embodiment of the present invention.
Figure 13B:
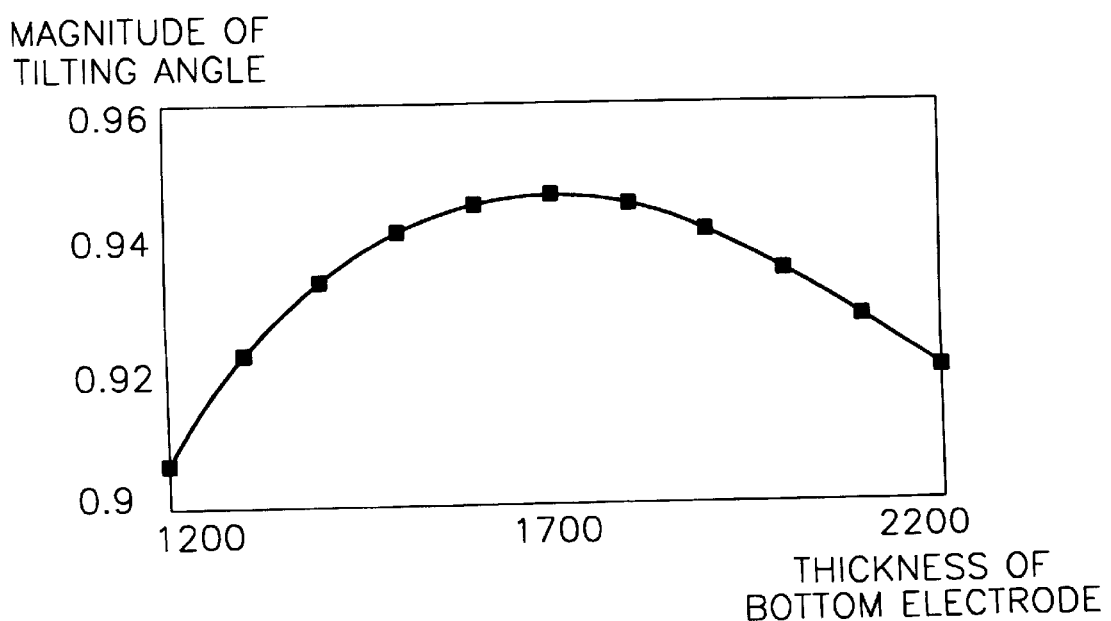

FIG. 11 is a cross-sectional view for showing a thin film actuated mirror array according to a second embodiment of the present invention, and FIG. 12 is a schematic magnified cross-sectional view of the actuator in FIG. 11, and FIGS. 13A and 13B are simulation graphs for showing specific tilting angles of the actuator according to the present embodiment. In FIGS. 11 to 13B, the same reference numerals are used for the same elements is FIG. 6.

In the present embodiment, the manufacturing steps of the thin film AMA are the same as those of the first embodiment except the actuator 210 further having second margins 350. The operation of the thin film AMA according to the present embodiment is the same as that of the first embodiment, too.

In the present embodiment, the second margins 350 are respectively formed between both ends of the first active layer 190 and both ends of the first top electrode 200. The second margins 350 are also respectively formed between both ends of the second active layer 191 and both ends of the second top electrode 201. Of course, the first margins 330 are respectively formed between both ends of one arm of the bottom electrode 180 and both ends of the first active layer 190, and the first margins 330 are also respectively formed between both ends of the other arm of the bottom electrode i80 and both ends of the second active layer 191. The lengths of the second margins 350 are the same as those of the first margins 330.

The simulation characteristics of the tilting angle of the actuator according to the present embodiment will be described.

In the present embodiment, the length of the actuator 210 is about 50 μm, the thicknesses of the first and the second top electrodes 200, 201 are about 500 Å respectively, the thicknesses of the first and the second active layers 190, 191 are about 3000 Å or about 4000 Å respectively, and the bottom electrode 180 has a thickness of about 1200 to 2600 Å.

The actuator 210 is tilted when the bottom electrode 180 receives a voltage of about 10V, and the first and the second top electrodes 200, 201 respectively receive voltages of about 0V.

Referring to FIG. 12, when the first and the second top electrodes 200, 201 respectively have thicknesses of t's, the bottom electrode 180 has a thickness of about 2.4 to 5.2 t, and the first and the second active layer 190, 191 respectively have thicknesses of about 6.0 t or 8.0 t. Also, the first margins 330 and the second margins 350 respectively have lengths of about 0.1 to 0.02 L when the lengths of the two arms of the bottom electrode 180 are respectively L's.

The first and the second active layer 190, 191 respectively have thicknesses of about 3000 Å in FIG. 13A and the thicknesses of the first and the second active layer 190, 191 are about 4000 Å in FIG. 13B.

The maximum tilting angle of the actuator 210 is about 0.57° as shown in FIG. 13A and the maximum tilting angle of the actuator 210 is about 0.95° as shown in FIG. 13B.

Embodiment 3

Figure 15:
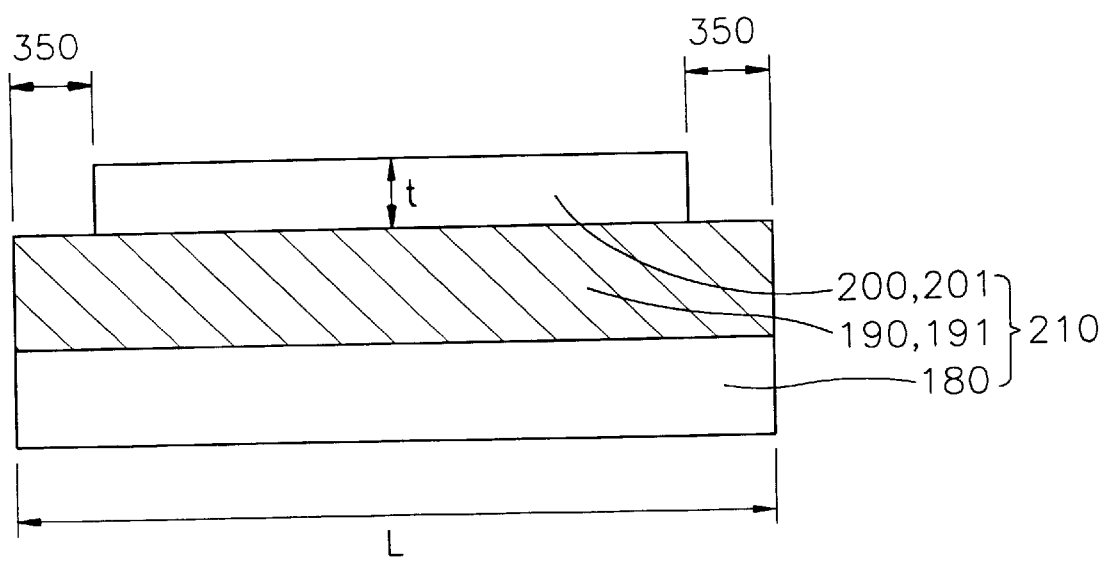
FIG. 15 is a schematic magnified cross-sectional view of the actuator in FIG. 14.
Figure 16A:
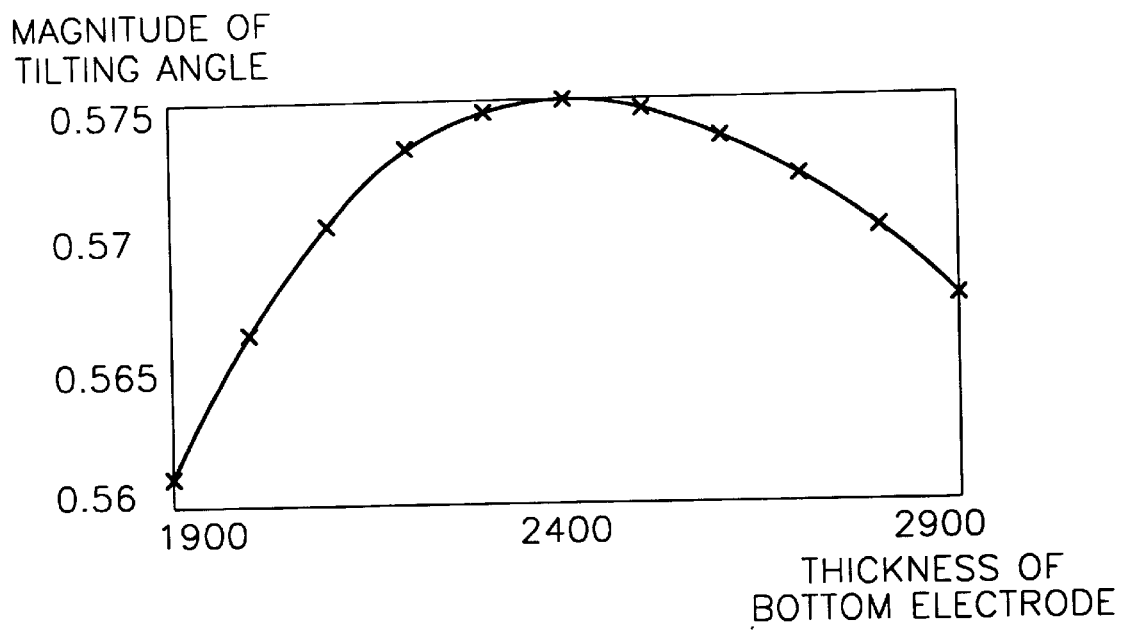
FIGS. 16A and 16B are simulation graphs for showing specific tilting angles of the actuator according to the third embodiment of the present invention.
Figure 16B:
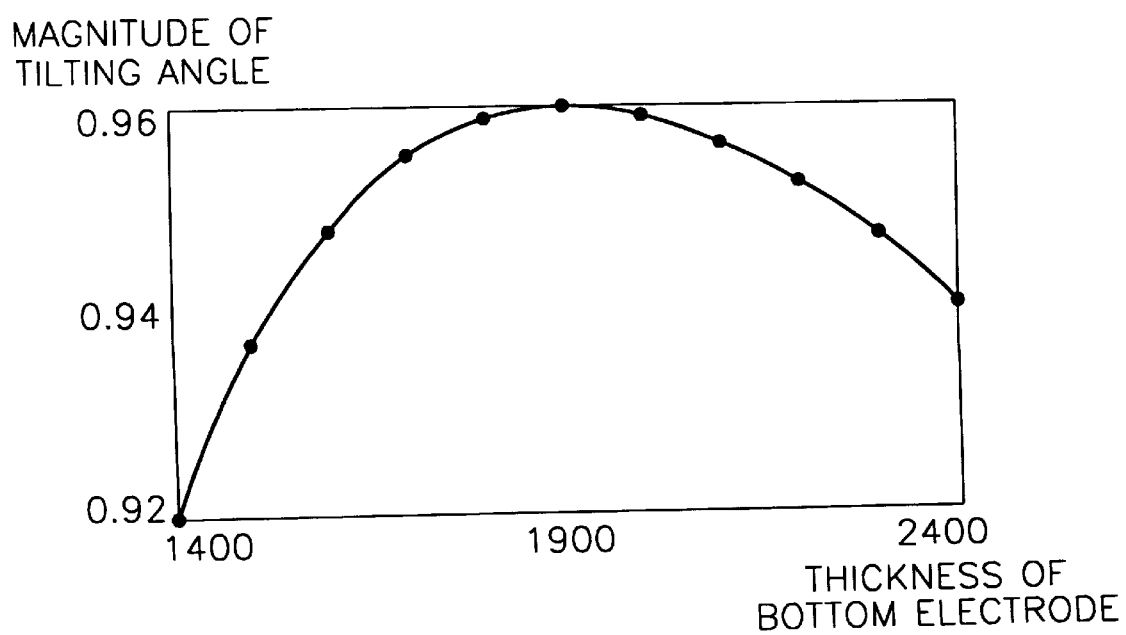

FIG. 14 is a cross-sectional view for showing a thin film actuated mirror array according to a third embodiment of the present invention, and FIG. 15 is a schematic magnified cross-sectional view of the actuator in FIG. 14, and FIGS. 16A and 16B are simulation graphs for showing specific tilting angles of the actuator according to the present embodiment. In FIGS. 14 to 16B, the same reference numerals are used for the same elements is FIG. 6.

In the present embodiment, the manufacturing steps of the thin film AMA are the same as those of the first embodiment except the actuator 210 having second margins 350 without the first margins 330. The operation of the thin film AMA according to the present embodiment is the same as that of the first embodiment, too.

In the present embodiment, the second margins 350 are respectively formed between both ends of the first active layer 190 and both ends of the first top electrode 200. The second margins 350 are also respectively formed between both ends of the second active layer 191 and both ends of the second top electrode 201. The first margins 330 are not formed in the present embodiment.

The simulation characteristics of the tilting angle of the actuator according to the present embodiment will be described.

In the present embodiment, the length of the actuator 210 is about 50 μm, the thicknesses of the first and the second top electrodes 200, 201 are about 500 Å respectively, the thicknesses of the first and the second active layers 190, 191 are about 3000 Å or about 4000 Å respectively, and the bottom electrode 180 has a thickness of about 1400 to 2900 Å. The actuator 210 is tilted when the bottom electrode 180 receives a voltage of about 10V, and the first and the second top electrodes 200, 201 respectively receive voltages of about 0V.

Referring to FIG. 15, when the first and the second top electrodes 200, 201 respectively have thicknesses of t's, the bottom electrode 180 has a thickness of about 2.8 to 5.8 t, and the first and the second active layer 190, 191 respectively have thicknesses of about 6.0 t or 8.0 t. Also, the second margins 350 respectively have lengths of about 0.1 to 0.02 L when the lengths of the two arms of the bottom electrode 180 are respectively L's.

The first and the second active layer 190, 191 respectively have thicknesses of about 3000 Å in FIG. 16A and the thicknesses of the first and the second active layer 190, 191 are about 4000 Å in FIG. 16B.

The maximum tilting angle of the actuator 210 is about 0.58° as shown in FIG. 16A and the maximum tilting angle of the actuator 210 is about 0.96° as shown in FIG. 16B.

Embodiment 4

Figure 17:
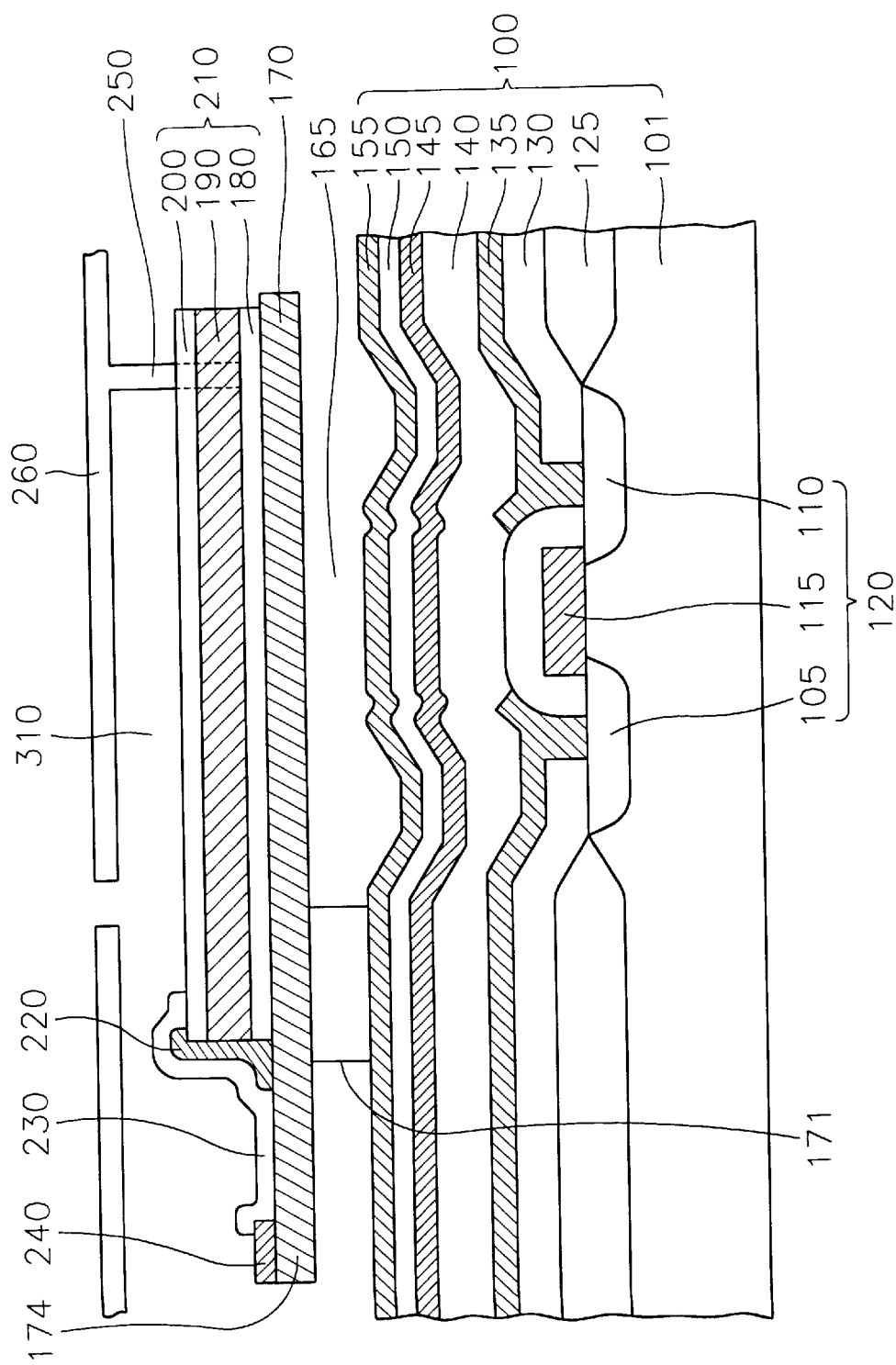
FIG. 17 is a cross-sectional view for showing a thin film actuated mirror array according to a fourth embodiment of the present invention.
Figure 18:
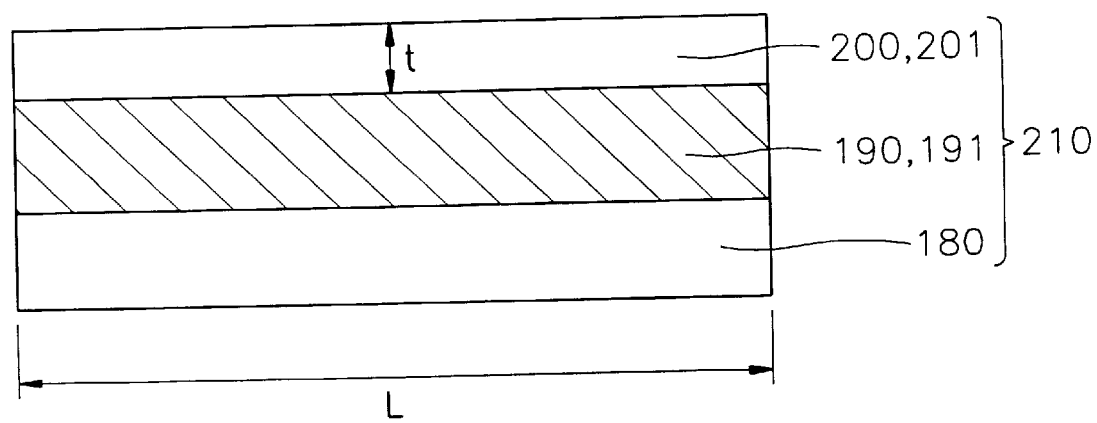
FIG. 18 is a schematic magnified cross-sectional view of the actuator in FIG. 17.
Figure 19A:
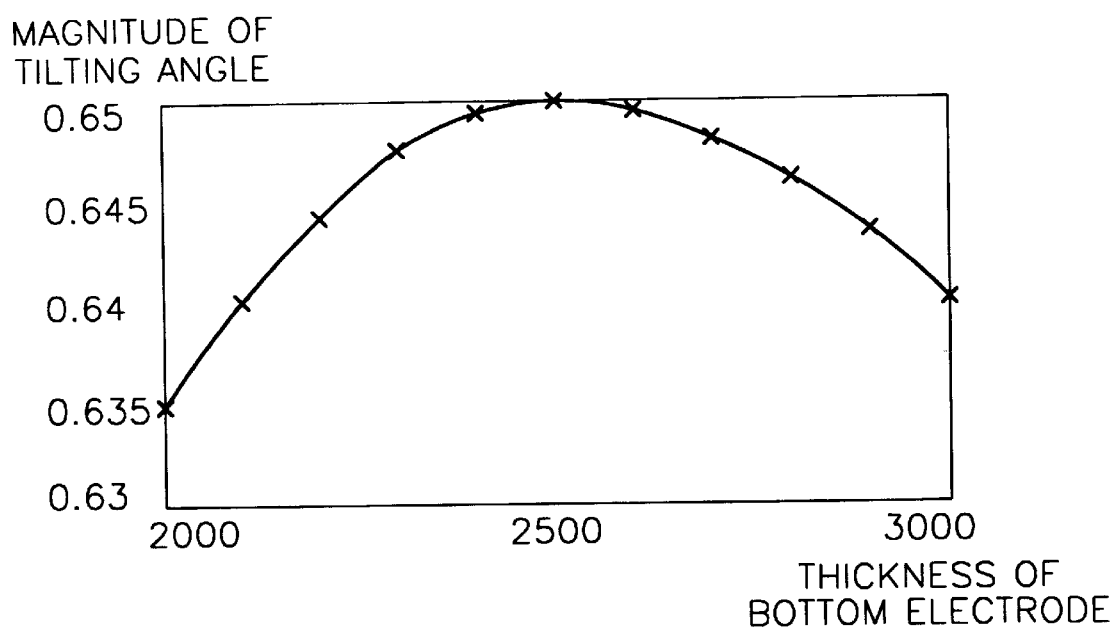
FIGS. 19A and 19B are simulation graphs for showing specific tilting angles of the actuator according to the fourth embodiment of the present invention.
Figure 19B:
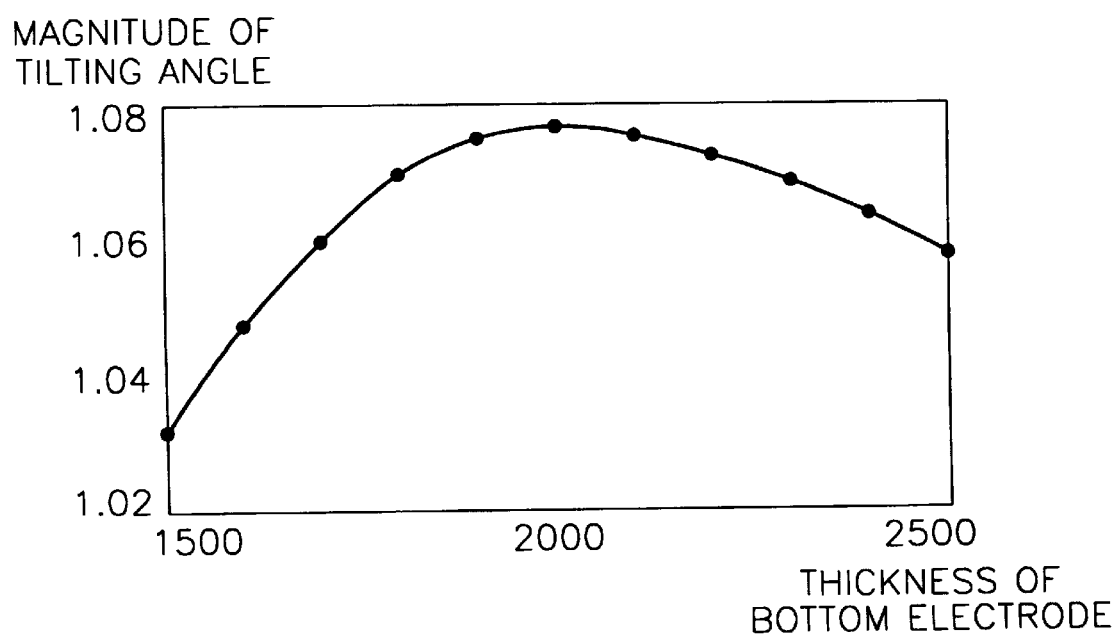

FIG. 17 is a cross-sectional view for showing a thin film actuated mirror array according to a fourth embodiment of the present invention, and FIG. 18 is a schematic magnified cross-sectional view of the actuator in FIG. 17, and FIGS. 19A and 19B are simulation graphs for showing specific tilting angles of the actuator according to the present embodiment. In FIGS. 17 to 19B, the same reference numerals are used for the same elements is FIG. 6.

In the present embodiment, the manufacturing steps of the thin film AMA are the same as those of the first embodiment except the actuator 210 having no margins. The operation of the thin film AMA according to the present embodiment is the same as that of the first embodiment, too.

In the present embodiment, the actuator 210 have no margins. That is, the first and the second top electrodes 200, 201 respectively have the same sizes as those of the first and the second active layers 190, 191, and the two arms of the bottom electrode 180 also have the same sizes as those of the first and the second active layers 190, 191 respectively.

The simulation characteristics of the tilting angle of the actuator according to the present embodiment will be described.

In the present embodiment, the length of the actuator 210 is about 50 μm, the thicknesses of the first and the second top electrodes 200, 201 are about 500 Å respectively, the thicknesses of the first and the second active layers 190, 191 are about 3000 Å or about 4000 Å respectively, and the bottom electrode 180 has a thickness of about 1500 to 3000 Å. The actuator 210 is tilted when the bottom electrode 180 receives a voltage of about 10V, and the first and the second top electrodes 200, 201 respectively receive voltages of about 0v.

Referring to FIG. 18, when the first and the second top electrodes 200, 201 respectively have thicknesses of t's, the bottom electrode 180 has a thickness of about 3.0 to 6.0 t, and the first and the second active layer 190, 191 respectively have thicknesses of about 6.0 t or 8.0 t.

The first and the second active layer 190, 191 respectively have thicknesses of about 3000 Å in FIG. 19A and the thicknesses of the first and the second active layer 190, 191 are about 4000 Å in FIG. 19B.

The maximum tilting angle of the actuator 210 is about 0.65° as shown in FIG. 19A and the maximum tilting angle of the actuator 210 is about 1.08° as shown in FIG. 19B.

As it describes above, the actuator can have a maximum tilting angle through the various constructions of the actuators and the simulation results, so the quality of the picture projected onto the screen can be increased and the arrangement of the AMA may be more easy. In the thin film AMA according to the present invention, the actuator having the first margins is preferable, in which the top electrodes have the same sizes as those of the active layers and the arms of the bottom electrodes are respectively longer than the lengths of the active layers by the first margins. Also, regarding the thicknesses of the layers of the actuator, it is preferably that the bottom electrode is 2 to 6 times thicker than the top electrodes and the active layers are 6 or 8 times thicker than the top electrodes.

Although preferred embodiments of the present invention have been described, it is understood that the present invention should not be limited to these preferred embodiments, but various changes and modifications can be made by one skilled in the art within the spirit and scope of the invention as hereinafter claimed.

What is claimed is:

1. A thin film actuated mirror array being actuated by a first signal and a second signal, said thin film actuated mirror array comprising:

an active matrix having a substrate including a metal oxide semiconductor transistor installed therein for a switching operation and a first metal layer having a drain pad prolonged from a drain of the metal oxide semiconductor for transmitting the first signal;

a supporting means having a supporting line formed above said active matrix, a supporting layer integrally formed with said supporting line, and a plurality of anchors respectively formed between said active matrix and portions of said supporting layer adjacent to said supporting line;

an actuator having i) a bottom electrode for receiving the first signal, said bottom electrode being formed on said supporting layer, ii) a first top electrode for receiving the second signal and generating a first electric field, said first top electrode corresponding to a first portion of said bottom electrode, iii) a second top electrode for receiving the second signal and generating a second electric field, said second top electrode corresponding to a second portion of said bottom electrode, iv) a first active layer formed between the first portion of said bottom electrode and said first top electrode and deformed by the first electric field, and v) a second active layer formed between the second portion of said bottom electrode and said second top electrode and deformed by the second electric field; and a reflecting means for reflecting a light, said reflecting means being formed above said actuator.

2. The thin film actuated mirror array as claimed in claim 1, wherein said bottom electrode has a reverse U-shape about said supporting line, said first active layer has a rectangular plate shape, said second active layer has a rectangular plate shape which is parallel to said first active layer, said first top electrode has a rectangular plate shape which is smaller than that of said first active layer, and said second top electrode has a rectangular plate shape which is smaller than that of said second active layer.

3. The thin film actuated mirror array as claimed in claim 1, wherein if a length of said bottom electrode is L, both ends of the first portion of said bottom electrode are respectively longer than both ends of said first active layer by margins of 0.01 L to 0.02 L and both ends of the second portion of said bottom electrode are respectively longer than both ends of said second active layer by margins of 0.01 L to 0.02 L.

4. The thin film actuated mirror array as claimed in claim 3, wherein said first active layer has a size equal to said first top electrode and said second active layer has a size equal to said second top electrode.

5. The thin film actuated mirror array as claimed in claim 3, wherein if said first and said second top electrodes respectively have thicknesses of t's, said first and said second active layers are respectively have thicknesses of about 6.0 to 8.0 t, and said bottom electrode has a thicknesses of about 2.5 to 5.5 t.

6. The thin film actuated mirror array as claimed in claim 1, wherein if a length of said bottom electrode is L, both ends of the first portion of said bottom electrode are respectively longer than both ends of said first active layer by margins of 0.01 L to 0.02 L, both ends of the second portion of said bottom electrode are respectively longer than both ends of said second active layer by margins of 0.01 L to 0.02 L, both ends of said first active layer are respectively longer than both ends of said first top electrode by margins of 0.01 L to 0.02 L, and both ends of said second active layer are respectively longer than both ends of said second top electrode by margins of 0.01 L to 0.02 L.

7. The thin film actuated mirror array as claimed in claim 6, wherein if said first and said second top electrodes respectively have thicknesses of t's, said first and said second active layers are respectively have thicknesses of about 6.0 to 8.0 t, and said bottom electrode has a thicknesses of about 2.0 to 5.5 t.

8. The thin film actuated mirror array as claimed in claim 1, wherein if a length of said bottom electrode is L, said first and said second active layers respectively have lengths of L's, both ends of said first active layer are respectively longer than both ends of said first top electrode by margins of 0.01 L to 0.02 L, and both ends of said second active layer are respectively longer than both ends of said second top electrode by margins of 0.01 L to 0.02 L.

9. The thin film actuated mirror array as claimed in claim 8, wherein if said first and said second top electrodes respectively have thicknesses of t's, said first and said second active layers are respectively have thicknesses of about 6.0 to 8.0 t, and said bottom electrode has a thicknesses of about 2.5 to 6.0 t.

10. The thin film actuated mirror array as claimed in claim 1, wherein if a length of said bottom electrode is L, said first and said second active layers respectively have lengths of L's, and said first and said top electrodes respectively have lengths of L's.

11. The thin film actuated mirror array as claimed in claim 10, wherein if said first and said second top electrodes respectively have thicknesses of t's, said first and said second active layers are respectively have thicknesses of about 6.0 to 8.0 t, and said bottom electrode has a thicknesses of about 3.0 to 6.0 t.

12. A thin film actuated mirror array being actuated by a first signal and a second signal, said thin film actuated mirror array comprising:

an active matrix having a substrate including a metal oxide semiconductor transistor installed therein for a switching operation and a first metal layer having a drain pad prolonged from a drain of the metal oxide semiconductor for transmitting the first signal;

a supporting means having a supporting line formed above said active matrix, a supporting layer integrally formed with said supporting line, and a plurality of anchors respectively formed between said active matrix and portions of said supporting layer adjacent to said supporting line;

an actuator having i) a bottom electrode for receiving the first signal, said bottom electrode being formed on said supporting layer and having a reverse U-shape about said supporting line, ii) a first top electrode for receiving the second signal and generating a first electric field, said first top electrode corresponding to a first portion of said bottom electrode and having a rectangular shape, iii) a second top electrode for receiving the second signal and generating a second electric field, said second top electrode corresponding to a second portion of said bottom electrode and having a rectangular shape, iv) a first active layer formed between the first portion of said bottom electrode and said first top electrode and deformed by the first electric field, said first active layer having a rectangular shape, and v) a second active layer formed between the second portion of said bottom electrode and said second top electrode and deformed by the second electric field, said second active layer having a rectangular shape; and a reflecting means for reflecting a light, said reflecting means being formed above said actuator.

13. The thin film actuated mirror array as claimed in claim 12, wherein if a length of said bottom electrode is L, both ends of the first portion of said bottom electrode are respectively longer than both ends of said first active layer by margins of 0.01 L to 0.02 L, both ends of the second portion of said bottom electrode are respectively longer than both ends of said second active layer by margins of 0.01 L to 0.02 L, said first active layer has a size equal to said first top electrode, and said second active layer has a size equal to said second top electrode.

14. The thin film actuated mirror array as claimed in claim 12, wherein if said first and said second top electrodes respectively have thicknesses of t's, said first and said second active layers are respectively have thicknesses of about 6.0 to 8.0 t, and said bottom electrode has a thicknesses of about 2.0 to 6.0 t.

15. The thin film actuated mirror array as claimed in claim 12, wherein if a length of said bottom electrode is L, both ends of the first portion of said bottom electrode are respectively longer than both ends of said first active layer by margins of 0.01 L to 0.02 L, both ends of the second portion of said bottom electrode are respectively longer than both ends of said second active layer by margins of 0.01 L to 0.02 L, both ends of said first active layer are respectively longer than both ends of said first top electrode by margins of 0.01 L to 0.02 L, and both ends of said second active layer are respectively longer than both ends of said second top electrode by margins of 0.01 L to 0.02 L.

16. The thin film actuated mirror array as claimed in claim 12, wherein if a length of said bottom electrode is L, said first and said second active layers respectively have lengths of L's, both ends of said first active layer are respectively longer than both ends of said first top electrode by margins of 0.01 L to 0.02 L, and both ends of said second active layer are respectively longer than both ends of said second top electrode by margins of 0.01 L to 0.02 L.

17. The thin film actuated mirror array as claimed in claim 12, if a length of said bottom electrode is L, said first and said second active layers respectively have lengths of L's, and said first and said top electrodes respectively have lengths of L's.

18. A thin film actuated mirror array being actuated by a first signal and a second signal, said thin film actuated mirror array comprising:

an active matrix having a substrate including a metal oxide semiconductor transistor installed therein for a switching operation and a first metal layer having a drain pad prolonged from a drain of the metal oxide semiconductor for transmitting the first signal;

a supporting means having a supporting line formed above said active matrix, a supporting layer integrally formed with said supporting line, and a plurality of anchors respectively formed between said active matrix and portions of said supporting layer adjacent to said supporting line;

an actuator having i) a bottom electrode for receiving the first signal, said bottom electrode being formed on said supporting layer and having a reverse U-shape about said supporting line, ii) a first top electrode for receiving the second signal and generating a first electric field, said first top electrode corresponding to a first portion of said bottom electrode and having a rectangular shape, iii) a second top electrode for receiving the second signal and generating a second electric field, said second top electrode corresponding to a second portion of said bottom electrode and having a rectangular shape, iv) a first active layer formed between the first portion of said bottom electrode and said first top electrode and deformed by the first electric field, said first active layer having a rectangular shape, and v) a second active layer formed between the second portion of said bottom electrode and said second top electrode and deformed by the second electric field, said second active layer having a rectangular shape, wherein if said first and said second top electrodes respectively have thicknesses of t's, said first and said second active layers are respectively have thicknesses of about 6.0 to 8.0 t, and said bottom electrode has a thicknesses of about 2.0 to 6.0 t; and a reflecting means for reflecting a light, said reflecting means being formed above said actuator.

19. The thin film actuated mirror array as claimed in claim 18, wherein if a length of said bottom electrode is L, both ends of the first portion of said bottom electrode are respectively longer than both ends of said first active layer by margins of 0.01 L to 0.02 L, both ends of the second portion of said bottom electrode are respectively longer than both ends of said second active layer by margins of 0.01 L to 0.02 L, said first active layer has a size equal to said first top electrode, and said second active layer has a size equal to said second top electrode.

20. The thin film actuated mirror array as claimed in claim 18, wherein if a length of said bottom electrode is L, both ends of the first portion of said bottom electrode are respectively longer than both ends of said first active layer by margins of 0.01 L to 0.02 L, both ends of the second portion of said bottom electrode are respectively longer than both ends of said second active layer by margins of 0.01 L to 0.02 L, both ends of said first active layer are respectively longer than both ends of said first top electrode by margins of 0.01 L to 0.02 L, and both ends of said second active layer are respectively longer than both ends of said second top electrode by margins of 0.01 L to 0.02 L.

* * * * *